United States Patent
Hori et al.

(10) Patent No.: US 8,215,843 B2
(45) Date of Patent: Jul. 10, 2012

(54) FLUID DYNAMIC BEARING DEVICE

(75) Inventors: Masaharu Hori, Kuwana (JP); Masaaki Toda, Kuwana (JP); Kenji Hibi, Kuwana (JP); Tetsuya Yamamoto, Kuwana (JP)

(73) Assignee: NTN Corporation, Osaka-shi (JP)

( * ) Notice: Subject to any disclaimer, the term of this patent is extended or adjusted under 35 U.S.C. 154(b) by 961 days.

(21) Appl. No.: 12/293,953

(22) PCT Filed: Mar. 22, 2007

(86) PCT No.: PCT/JP2007/055859
§ 371 (c)(1),
(2), (4) Date: Sep. 22, 2008

(87) PCT Pub. No.: WO2007/111218
PCT Pub. Date: Oct. 4, 2007

(65) Prior Publication Data
US 2009/0285514 A1 Nov. 19, 2009

(30) Foreign Application Priority Data

Mar. 24, 2006 (JP) ................................ 2006-083457
Mar. 24, 2006 (JP) ................................ 2006-083470
Apr. 3, 2006 (JP) ................................ 2006-102265
Jun. 5, 2006 (JP) ................................ 2006-156309

(51) Int. Cl.
*F16C 32/06* (2006.01)
*F16C 33/10* (2006.01)

(52) U.S. Cl. ........ 384/107; 384/100; 384/112; 384/114; 384/291

(58) Field of Classification Search .................. 384/100, 384/107, 112, 114, 115, 123; 29/898.02
See application file for complete search history.

(56) References Cited

U.S. PATENT DOCUMENTS

| 2,067,034 | A | * | 1/1937 | Whiteley | ....................... 384/292 |
| 4,797,009 | A | * | 1/1989 | Yamazaki | ..................... 384/100 |
| 5,129,739 | A | * | 7/1992 | Asai et al. | ..................... 384/292 |
| 5,356,226 | A | * | 10/1994 | Onishi et al. | .................. 384/119 |
| 5,407,281 | A | | 4/1995 | Chen | |
| 2003/0169952 | A1 | | 9/2003 | Yamashita et al. | |

(Continued)

FOREIGN PATENT DOCUMENTS

EP 510695 A2 * 10/1992

(Continued)

OTHER PUBLICATIONS

Chinese Office Action dated Sep. 21, 2011, issued in corresponding Chinese Application No. 201010130319.8.

(Continued)

*Primary Examiner* — Marcus Charles
(74) *Attorney, Agent, or Firm* — Westerman, Hattori, Daniels & Adrian, LLP

(57) ABSTRACT

A fluid dynamic bearing device includes a bearing sleeve including a radial bearing surface, a shaft member to be inserted to an inner circumference of the bearing member, and a radial bearing part for non-contact supporting the shaft member in a radial direction by a dynamic pressure action of a fluid generated in a radial bearing gap between the radial bearing surface of the bearing member and an outer circumferential surface of the shaft member. Additionally, a plurality of bearing sleeves are axially arranged, and each bearing sleeve is formed having different axial length with respect to one another.

7 Claims, 22 Drawing Sheets

U.S. PATENT DOCUMENTS

2004/0258335 A1    12/2004   Shimizu et al.
2007/0286538 A1 *  12/2007   Mizutani ...................... 384/112

FOREIGN PATENT DOCUMENTS

| JP | 56164220 A | * | 12/1981 |
| JP | 58057915 A | * | 4/1983 |
| JP | 60-121308 A | | 6/1985 |
| JP | 63-84419 U | | 6/1988 |
| JP | 8-86311 A | | 4/1996 |
| JP | 09238441 A | * | 9/1997 |
| JP | 09-331653 A | * | 12/1997 |
| JP | 11-093941 A | * | 4/1999 |
| JP | 11098763 A | * | 4/1999 |
| JP | 11-269475 A | | 10/1999 |
| JP | 2001-161047 A | | 6/2001 |
| JP | 2002-276649 A | | 9/2002 |
| JP | 2003-239951 A | | 8/2003 |
| JP | 2003-294027 A | * | 10/2003 |
| JP | 2003314538 A | * | 11/2003 |
| JP | 2004-132402 A | | 4/2004 |
| JP | 3602707 B2 | | 12/2004 |
| JP | 2005-003042 A | | 1/2005 |
| JP | 2005-321089 A | | 11/2005 |
| JP | 2006-090554 A | | 4/2006 |
| JP | 2007327545 A | * | 12/2007 |
| WO | 2005/098252 A1 | | 10/2005 |

OTHER PUBLICATIONS

International Preliminary Report on Patentability (Form PCT/IB/373) of International Application No. PCT/JP2007/055859 date of issuance Oct. 21, 2008, with Forms PCT/ISA/237.

Japanese Office Action dated Oct. 13, 2011, issued in corresponding Japanese Patent Application No. 2006-156309.(w/partial English translation).

International Search Report of PCT/JP2007/055859, date of mailing: Jun. 12, 2007.

Japanese Office Action dated Feb. 7, 2012, issued in corresponding Japanese Patent Application No. 2006-156309.(w/partial translation).

* cited by examiner (A)

(B)

(A)

(B)

(C)

FLUID DYNAMIC BEARING DEVICE

CROSS-REFERENCE TO RELATED APPLICATIONS

This application is a national stage application filed under 35 USC §371 of International Application No. PCT/JP2007/055859, filed Mar. 22, 2007, and which claims priority to Japanese Application No. 2006-083457, filed Mar. 24, 2005, Japanese Application No. 2006-083470, filed Mar. 24, 2006 and Japanese Application No. 2006-102265, filed Apr. 3, 2006, the entire contents of which are herein incorporated by reference.

TECHNICAL FIELD

The present invention relates to a fluid dynamic bearing device.

BACKGROUND ART

A fluid dynamic bearing device supports a shaft member in a freely rotating manner with an oil film formed in a bearing gap. The fluid dynamic bearing device has characteristics of high-speed rotation, high rotational accuracy, low noise, and the like, and is recently being widely used as a bearing for a spindle motor mounted on information equipment such as a magnetic disk device including an HDD and an FDD, an optical disk device including a CD-ROM, a CD-R/RW, and a DVD-ROM/RAM, a magneto optical disk device including MD and MO, for a fan motor mounted on a personal computer (PC), etc. to cool a heat generating source, while exploiting such characteristics.

For example, in a fluid dynamic bearing device incorporated in a spindle motor of a disk drive of HDD and the like, a radial bearing part for supporting a shaft member in a radial direction and a thrust bearing part for supporting in a thrust direction both may be constructed of a dynamic pressure bearing. For the radial bearing part in this type of fluid dynamic bearing device, for example, a fluid dynamic bearing device in which a dynamic pressure groove serving as a dynamic pressure generating part is formed in any one of an inner circumferential surface of a bearing sleeve or an outer circumferential surface of the shaft member opposed thereto, and a radial bearing gap is formed between such surfaces is known as described in JP 2003-239951 A (Patent document 1).

In information equipment incorporating the fluid dynamic bearing device having the above-mentioned configuration such as the disk drive of HDD, mounting of a plurality of disks is requested in an aim of increasing capacity, but in this case, a moment load acting on the bearing part that supports a spindle shaft in a freely rotating manner becomes large. In order to respond to such increase in the moment load, there is a need to arrange the radial bearing part at a plurality of locations spaced apart in an axial direction, and set a span between the radial bearing parts large to enhance moment rigidity. A configuration in which a plurality of radial bearing parts are arranged on the inner circumferential side of one bearing sleeve is widely adopted including Patent document 1, but there are demands for downsizing of the motor, and decrease in diameter of the spindle shaft and the bearing sleeve accompanied therewith, and hence it is sometimes difficult to manufacture the bearing sleeve that can respond to increase in span between the radial bearing parts.

As means for increasing the span between the radial bearing parts and enhancing the moment rigidity, and for facilitating the manufacturing of the bearing sleeve, a configuration of axially disposing the bearing sleeve at a plurality of locations (e.g., two locations) as described in JP 11-269475 A (Patent document 2) and JP 3602707 B (Patent document 3) has been considered. However, in the fluid dynamic bearing device of such configuration, the array pattern and the arrangement location of the dynamic pressure groove arranged on the inner circumferential surface etc. are different in each bearing sleeve in view of the rotating direction, but the axial dimension thereof is formed the same and the difference in appearance is extremely small. Thus, the assembling direction or the assembling position tends to be easily mistaken, and parts control becomes complicated. The function as the bearing device may not be fulfilled if the assembling direction etc. is mistaken, and hence special consideration needs to be made for assembling, which runs up the manufacturing cost of the bearing device.

As another means for enhancing the moment rigidity, a structure in which the bearing span of the thrust bearing part is enlarged can be adopted. For the fluid dynamic bearing device having such type of structure, a fluid dynamic bearing device in which the thrust bearing part is arranged on both end sides of the bearing sleeve as disclosed in JP 2005-321089 A (Patent document 4) is known. A structure combining the configurations of the above-mentioned Patent document 2 (or Patent document 3) and Patent document 4 may be adopted in an aim of further enhancing the moment rigidity. In the case of such configuration, the dynamic pressure generating means such as the dynamic pressure groove for generating the fluid dynamic pressure at the thrust bearing gap is often arranged at the end surface of the bearing sleeve made of sintered metal in view of formability, but each dynamic pressure groove needs to have different slope directions in view of the rotating direction. Therefore, while two types of bearing sleeves become necessary, they are formed into substantially the same shape of a level difficult to be distinguished with eyes. Accordingly, the assembling direction and the assembling position tend to be easily mistaken. Similarly to the above, the function as the bearing device may not be fulfilled if the assembling direction etc. is mistaken, and hence special consideration needs to be made for assembling, which runs up the manufacturing cost of the bearing device.

In the configuration of the above-mentioned Patent document 2 (or 3), the moment rigidity is enhanced by increasing the bearing span between the radial bearing parts and the manufacturing of the bearing sleeve is facilitated, but following problems arise when assembling the bearing device. In other words, in such configuration, even when the individual bearing sleeve is formed at high accuracy, core shift may occur when fixing each bearing sleeve to a housing with means such as adhesion and press-fitting. The lowering in coaxiality between both radial bearing surfaces caused by the core shift leads to variation in bearing rigidity, and hence lowering in bearing performance including moment rigidity becomes a concern.

The rotational performance of the fluid dynamic bearing device is determined by a width accuracy of the bearing gap (e.g., radial bearing gap) in the first place. Thus, efforts have been made to form the outer circumferential surface of the shaft member and the inner circumferential surface of the bearing sleeve (bearing member) forming the radial bearing gap at satisfactory accuracy. The gap width of the radial bearing gap is often formed evenly over the entire axial length as described in JP 2004-132402 A (Patent document 5).

In incorporation to the motor, various rotating bodies are assembled to the shaft member of the fluid dynamic bearing device, but the barycentric position of the rotating body differs in each case since the size, the weight, and the like of the rotating body to be assembled differ depending on the motor. Therefore, if the gap width of the radial bearing gap is evenly formed over the entire axial length as described above, the bearing rigidity including the moment rigidity lacks when vibration or impact is applied to the fluid dynamic bearing device, whereby the shift amount of the rotating body may increase or resonance phenomenon may occur.

Moreover, in addition to the enhancement of the moment rigidity, enhancement of rotational accuracy is desired in the fluid dynamic bearing device to be incorporated in the spindle motor. In order to respond to this, the inner circumferential surface of the bearing member and the outer circumferential surface of the shaft member forming the radial bearing gap need to be finished to a higher accuracy, but generally, finishing the inner circumferential surface at high accuracy is more difficult than finishing the outer circumferential surface at high accuracy, and there is a limit to improving the processing accuracy with general machining.

[Patent document 1] Japanese Laid-Open Patent Publication No. 2003-239951
[Patent document 2] Japanese Laid-Open Patent Publication No. 11-269475
[Patent document 3] Japanese Patent Publication No. 3602707
[Patent document 4] Japanese Laid-Open Patent Publication No. 2005-321089
[Patent document 5] Japanese Laid-Open Patent Publication No. 2004-132402

DISCLOSURE OF THE INVENTION

Problems to be Solved by the Invention

The present invention has been made in view of the above-mentioned problems, a first object of the present invention is to provide a fluid dynamic bearing device which has excellent moment rigidity and an improved working efficiency in assembling and parts control, and in which a bearing sleeve can be easily manufactured.

A second object of the present invention is to provide a fluid dynamic bearing device having excellent moment rigidity while avoiding lowering of bearing performance resulting from the assembly accuracy as much as possible.

A third object of the present invention is to provide a fluid dynamic bearing device which has an enhanced width accuracy of the radial bearing gap and excellent bearing performance including moment rigidity at low cost.

Means for Solving the Problems

In order to solve the above-mentioned first object, the present invention provides a fluid dynamic bearing device including: a bearing sleeve including a radial bearing surface; a shaft member to be inserted to an inner circumference of the bearing sleeve; and a radial bearing part for non-contact supporting the shaft member in a radial direction by a dynamic pressure action of a fluid generated in a radial bearing gap between the radial bearing surface of the bearing sleeve and an outer circumferential surface of the shaft member, characterized in that a plurality of bearing sleeves are axially arranged, and each bearing sleeve is formed with different axial lengths from each other.

According to the above-mentioned configuration, the span between the radial bearing parts can be increased to enhance the load capacity on the moment load and facilitate the manufacturing of the bearing sleeve, since the bearing sleeve is axially disposed at the plurality of locations. Further, the axial length of the bearing sleeve axially disposed at the plurality of locations is differed from each other, and hence the difference in outer appearance becomes more definite, assembly mistake is reliably prevented, and parts control can be simplified.

For example, when axially disposing the bearing sleeve at two locations, the radial bearing surface of one bearing sleeve is normally arranged at the inner circumference of the end on the side away from the other bearing sleeve from the standpoint of increasing the bearing span of the radial bearing part. In this case, however, it is difficult to ensure coaxiality between the ends of the bearing sleeve in which the axial dimension particularly is increased, and further, between the bearing sleeves (radial bearing surfaces), which may adversely affect the rotational performance of the bearing device.

Therefore, the present invention provides a configuration in which a convex part having a diameter same as the radial bearing surface is provided on an inner circumferential surface of at least any one of the two adjacent bearing sleeves at a position on the other bearing sleeve side rather than the radial bearing surface. According to such configuration, the assembly task can be easily conducted while ensuring coaxiality between the ends of a single bearing sleeve and between the bearing sleeves when an assembly pin and the like is inserted. The convex part is desirably formed into a shape (e.g., band shape) that does not have a dynamic pressure generating function since torque increases if formed into a shape having the dynamic pressure generating function. The convex part may have a slightly different diameter from the radial bearing surface if the coaxiality of an extent to which the rotational performance is not adversely affected can be ensured. Therefore, "convex part of same diameter" herein includes the concave part of slightly different diameter.

In the above-mentioned configuration, a projecting part projecting to an outer diameter side may be arranged at the shaft member, and a thrust bearing part for non-contact supporting the shaft member in a thrust direction with the dynamic pressure action of the fluid generated in a thrust bearing gap may be provided between an end surface of the projecting part and an end surface of the bearing sleeve. The projecting part may be integrally formed with the shaft member, or may be fixed to the shaft member. The dynamic pressure generating means such as dynamic pressure groove for generating the dynamic pressure action in the thrust bearing gap of the thrust bearing part may be formed in at least any one of the end surface of the projecting part or the end surface of the bearing sleeve.

A seal space may be formed on an outer circumferential side of the projecting part arranged on the shaft member. The seal space has a function, or a so-called buffer function, of absorbing change in capacity (expansion, contraction) due to temperature change in the fluid (e.g., lubricating oil) filled inside the bearing device.

As another configuration to solve the above-mentioned first object, the present invention provides a fluid dynamic bearing device including: a bearing member; a rotating body including a shaft member to be inserted to an inner circumference of the bearing member; first and second thrust bearing gaps formed between the bearing member and the rotating body; a first dynamic pressure groove region for generating a fluid dynamic pressure in the first thrust bearing gap; and a second dynamic pressure groove region for generating a fluid dynamic pressure in the second thrust bearing gap, characterized in that the bearing member includes two bearing sleeves arrayed in an axial direction, the two bearing sleeves both have the first dynamic pressure groove region and the second dynamic pressure groove region at both ends faces, the first dynamic pressure groove region of one bearing sleeve faces the first thrust bearing gap, and the second dynamic pressure groove region of another bearing sleeve faces the second thrust bearing gap.

As described above, the bearing member has two bearing sleeves, and hence the moment rigidity can be enhanced by increasing the bearing span of the radial bearing part, and the manufacturing of the bearing sleeve can be facilitated. The bearing sleeves both have a first dynamic pressure groove region and a second dynamic pressure groove region at both end surfaces, where the first dynamic pressure groove region of one of the bearing sleeves faces a first thrust bearing gap and the second dynamic pressure groove region of the other bearing sleeve faces a second thrust bearing gap, that is, the two same bearing sleeves are axially lined. Therefore, each bearing sleeve can be assembled to the housing without taking the upper and lower arrangement into consideration, whereby the fluid dynamic bearing device having further excellent moment rigidity can be easily formed with the first thrust bearing gap formed on one end side of the bearing member and the second bearing gap formed on the other end side. As the bearing sleeve can be formed as one type, the part unit price can be reduced, and the parts control cost can be reduced.

If the first dynamic pressure groove region and the second dynamic pressure groove region are formed into different shapes, the upper and lower side of each bearing sleeve can be easily distinguished, and assembling is further facilitated. "Different shape" herein includes, in addition to the configuration of forming one bearing sleeve with a plurality of dynamic pressure grooves arrayed in a spiral shape and forming the other bearing sleeve with a plurality of dynamic pressure grooves arrayed in a herringbone shape, differing the number of grooves of the dynamic pressure grooves arrayed in the same shape. The former configuration is desirable in terms of enhancing the distinguishing property. If the required pressure differs between the first thrust bearing gap and the second bearing gap depending on the application of the fluid dynamic bearing device, the array pattern of the dynamic pressure groove may be changed therewith.

A spacer member may be interposed between the two bearing sleeves. The spacer member can be made of material without porous tissue (non-porous material) if the bearing sleeve is made of sintered metal containing oil, for example. In this case, the amount of lubricating oil contained in the bearing device can be reduced, and hence the cost can be lowered by the reduction in the total amount of oil. Further, the capacity of the seal space can be reduced by the reduction in the amount of oil, and the bearing span of the radial bearing part can be further increased, that is, the moment rigidity can be further enhanced.

The fluid dynamic bearing device having the above-mentioned configuration is preferably used in a motor including the fluid dynamic bearing device, a stator coil, and a rotor magnet, and in particular, in a motor that requires high moment rigidity with higher speed rotation and heavier weight of the rotating body.

In order to solve the above-mentioned second object, the present invention provides a fluid dynamic bearing device including a bearing member in which a plurality of radial bearing surfaces are arranged spaced apart in an axial direction at an inner circumference, a rotating body including a shaft member to be inserted to the inner circumference of the bearing member, and a plurality of radial bearing parts for non-contact supporting the rotating body with a dynamic pressure action of a fluid generated in a radial bearing gap between the radial bearing surface and an outer circumferential surface of the shaft member, featured in that the bearing member includes a plurality of bearing sleeves arrayed in the axial direction, the plurality of radial bearing surfaces are all arranged on a first bearing sleeve of the plurality of bearing sleeves, and the first bearing sleeve is disposed on a side close to an axial barycentric position of the rotating body. The rotating body refers to the entire object that rotates as a spindle of the fluid dynamic bearing device, and refers to an object including all members capable of being attached to the shaft member and being integrally rotatable with the shaft member. For instance, when using the fluid dynamic bearing device by being incorporated in a disk drive such as HDD, the rotating body refers to an assembly including all of a shaft member, a magnet and a disk constituting a drive unit, and a hub etc. (clamper etc.) for attaching the magnet and the disk to the shaft member. When using the fluid dynamic bearing device by being incorporated in a fan motor and the like, the rotating body refers to an assembly including all of a shaft member, a magnet constituting a drive unit, and a fan etc. fixed to the shaft member through a hub etc.

As described above, the present invention is featured in that all the radial bearing surfaces are arranged on one bearing sleeve of the plurality of bearing sleeves constituting the bearing member, and the relevant bearing sleeve is disposed on a side close to an axial barycentric position of the rotating body to be supported. That is, all the radial bearing surfaces are collected in one bearing sleeve, and hence lowering in coaxiality due to arrangement of the radial bearing surface in each of the plurality of bearing sleeves and the lowering in bearing rigidity can be avoided. Compared to aligning coaxiality among the plurality of bearing sleeves, the working efficiency is significantly enhanced thereby enabling reduction in processing cost. In addition, the bearing sleeve is disposed on the side close to the axial barycentric position of the rotating body in the present invention, that is, the radial bearing part is formed at a location close to the axial barycentric position of the rotating body as much as possible, and hence the rotating body can be supported at an appropriate location that matches the barycentric position of the rotating body to be supported. Thus, high moment rigidity can be ensured while compensating for the difference with the bearing span between the radial bearing parts in the case that the radial bearing surfaces are arranged distributed among the plurality of bearing sleeves.

A configuration in which a second bearing sleeve without a radial bearing surface on an inner circumference is axially disposed on one side of a first bearing sleeve of a plurality of bearing sleeves constituting the bearing member is provided as a specific configuration. In this case, the bearing member includes a housing for holding the plurality of bearing sleeves at the inner circumference, and the housing may be integrally formed with the second bearing sleeve. The bearing member may further include a third bearing sleeve without a radial bearing surface on the inner circumference. In this case, the third bearing sleeve may be axially disposed on the other side of the first bearing sleeve. Further, when the bearing member includes a housing integrally formed with the second bearing, the first bearing sleeve may be axially disposed on one side of the second bearing sleeve, and the third bearing sleeve may be axially disposed on the other side.

In an aim of further enhancing the moment rigidity, a configuration of arranging the thrust bearing surface at a first end surface situated at the most end side in the axial direction and at a second end surface most distant from the first end surface in the axial direction of the end surfaces of the plurality of bearing sleeves constituting the bearing member may be adopted. According to such configuration, each thrust bearing surface may be arranged at a position spaced apart as much as possible in the axial direction of the bearing member. The separated distance in the axial direction of the thrust bearing part formed between the rotating body is made as large as possible, and the moment rigidity can be further enhanced.

In order to solve the above-mentioned third object, the present invention provides a fluid dynamic bearing device including a bearing member, a rotating body including a shaft member to be inserted to an inner circumference of the bearing member, and a radial bearing part for supporting the rotating body including the shaft member in a radial direction with a fluid film generated in a radial bearing gap formed between the bearing member and the shaft member, featured in that a gap width out of the radial bearing gap is axially differed, a narrow width part of a wide width part having a large gap width and a narrow width part having a small gap width is arranged on a barycentric position side of the rotating body, and a region facing at least the radial bearing gap of the bearing member is formed to an electroformed part made of deposited metal. Note that, "rotating body" refers to an object including all members capable of being attached to the shaft member and being integrally rotated with the shaft member. For instance, when used by being incorporated in the spindle motor of HDD etc., the rotating body refers to an assembly including all of a shaft member, a disk hub arranged on the shaft member, and a magnet and a disk fixed to the disk hub, and Further, a clamper etc. When used by being incorporated in a fan motor and the like, the rotating body refers to an assembly including all of a shaft member, a fan fixed to the shaft member through a hub etc., a magnet, and the like.

Generally, the rigidity (bearing rigidity) of the fluid film formed in the radial bearing gap becomes higher as the gap width of the radial bearing gap becomes smaller. Therefore, as described above, the gap width of the radial bearing gap is differed in the axial direction, a narrow width part out of a wide width part having a large gap width and a narrow width part having a small gap width is arranged on a barycentric position side of the rotating body, and hence the bearing rigidity can be enhanced near the center of gravity of the rotating body and the bearing rigidity can be lowered in the region distant from the center of gravity. Thus, ensuring of bearing rigidity and lowering of torque can be simultaneously achieved, and the supporting accuracy of the rotating body can be enhanced. Further, the separated distance between the bearing center of the radial bearing part and the barycentric position of the rotating body can be shorted, and the moment rigidity can be enhanced. The above configuration is obtained by forming the shaft member at a constant diameter and forming the bearing member at different diameters, or forming the shaft member at different diameters and the bearing member at a constant diameter in the axial region facing the radial bearing gap.

The present invention is featured in that a region (so-called radial bearing surface) facing at least the radial bearing gap of the bearing member is arranged in the electroformed part made of deposited metal. The electroformed part is formed by methods complying with electrolytic plating (electrical plating) or electroless plating (chemical plating). In terms of the characteristics of such methods, the surface on the deposition starting side of the electroformed part constitutes a fine surface in which the shape of the surface of the master forming the same is transferred at high accuracy to the level of micron order, and hence the inner circumferential surface accuracy of the bearing member can be easily enhanced by finishing the surface of the master to a predetermined shape accuracy without performing particular finishing process etc. Therefore, the width accuracy of the radial bearing gap can be easily enhanced at low cost by arranging the radial bearing surface on the electroformed part, in particular, on the deposition starting surface. Further, according to the relevant configuration, the radial bearing surface is a metal surface, and hence change in characteristics of the radial bearing surface involved in temperature change can be suppressed, and lowering in rotational accuracy can be suppressed as much as possible.

In the above-mentioned configuration, the gap width of the radial bearing gap that ensures the desired rotational accuracy can be defined as a ratio $\delta/d$ of the minimum diameter gap $\delta$ of the radial bearing gap with respect to the shaft diameter d of the shaft member, and the inventors of the present invention have found that the ratio $\delta/d$ merely needs to be in a range of $1/1000 \leqq \delta/d \leqq 1/250$ through verification. The reasons are as described below.

First, the lower limit value 1/1000 of the ratio $\delta/d$ can be obtained from circularity, cylindricality, and the like of the outer circumferential surface of the master and the shaft member, and the inner circumferential surface of the electroformed part. That is, when the diameter gap $\delta$ becomes smaller than the circularity, cylindricality of the outer circumferential surface of the shaft member, and the inner circumferential surface of the bearing member, the shaft member and the bearing member contact to each other, and a predetermined performance becomes difficult to be ensured. The circularity and the like of the outer circumferential surface of the shaft member, and the inner circumferential surface of the bearing member may be further enhanced, but increase in cost is inevitable with higher accuracy. Therefore, the ratio $\delta/d$ is desirably greater than or equal to 1/1000 in view of the balance between the function aspect and the cost aspect. The upper limit value 1/250 of the ratio $\delta/d$ can be obtained from the standpoint of rotational accuracy and moment rigidity. In other words, if the minimum diameter gap $\delta$ of the radial bearing gap becomes larger, the desired bearing rigidity and the moment rigidity cannot be ensured, and drawbacks such as degradation of the rotational accuracy and contact of the shaft member and the bearing member occur. Therefore, the ratio $\delta/d$ is desirably smaller than or equal to 1/250.

In the above-mentioned configuration, for example, when arranging the wide width part at one end of the radial bearing gap and the narrow width part at the other end of the radial bearing gap, and the gap width is gradually reduced from the wide width part towards the narrow width part, the inventors of the present invention have found through close research that the ratio $\epsilon/L$ of the axial length L of the radial bearing gap and the reduction amount $\epsilon$ of the radial gap in the entire axial length of the radial bearing gap, that is, the slope $\epsilon/L$ is desirably $1/1000 \leqq \epsilon/L \leqq 1/500$. If the ratio $\epsilon/L$ is smaller than 1/1000, it is difficult to sufficiently obtain the effect of enhancing the bearing rigidity and the effect of reducing torque as described above. If greater than 1/500, the value of the wide width part becomes too large and the bearing rigidity lacks, and the rotational accuracy may degrade, and Further, the extent of forced removal of the master becomes large in molding the bearing member, which may possibly damage the radial bearing surface.

The dynamic pressure generating part for generating the fluid dynamic pressure in the radial bearing gap may be arranged in the above-mentioned fluid dynamic bearing device, and hence the radial bearing part can be constituted as the dynamic pressure bearing having excellent rotational accuracy. The dynamic pressure generating part may be formed on the inner circumferential surface of the electroformed part or the outer circumferential surface of the shaft member, but can be formed easily and at high accuracy by simply forming a mold part corresponding to the dynamic pressure generating part on the master surface used in electroforming process. Thus, the dynamic pressure generating part is desirably formed on the inner circumferential surface of the electroformed part rather than the outer circumferential surface of the shaft member. The dynamic pressure generating part may adopt various known shapes such as inclined groove, axial groove, or circular arc surface. If such dynamic pressure generating part is arranged, the region facing the dynamic pressure generating part of the gap formed between the inner circumferential surface of the bearing member and the outer circumferential surface of the shaft member constitutes the radial bearing gap of the present invention.

Effects of the Invention

As described above, there can be provided the fluid dynamic bearing device which has excellent moment rigidity and an improved working efficiency in assembling and parts control, and in which a bearing sleeve can be easily manufactured by axially disposing a plurality of bearing sleeves and forming each bearing sleeve with different axial lengths from each other.

Further, as described above, there can be provided the fluid dynamic bearing device which has excellent moment rigidity and an improved working efficiency in assembling and parts control, and in which a bearing sleeve can be easily manufactured by adopting a configuration in which the bearing member includes two bearing sleeves arrayed in the axial direction, the two bearing sleeves both have a first dynamic pressure groove region and a second dynamic pressure groove region at both end surfaces, the first dynamic pressure groove region of one bearing sleeve faces the first thrust bearing gap, and the second dynamic pressure groove region of the other bearing sleeve faces the second thrust bearing gap.

Moreover, as described above, there can be provided the fluid dynamic bearing device which avoids lowering of bearing performance caused by the assembly accuracy as much as possible and exhibits high moment rigidity by arranging a plurality of bearing sleeves arrayed in the axial direction in the bearing member, arranging a plurality of radial bearing surfaces all on the first bearing sleeve of the plurality of bearing sleeves, and disposing the first bearing sleeve on the side close to the axial barycentric position of the rotating body.

Further, as described above, there can be provided the fluid dynamic bearing device which has excellent bearing performance including moment rigidity and enhances width accuracy of the radial bearing surface by axially differing the gap width of the radial bearing gap, arranging the narrow width part, of the wide width part having a large gap width and the narrow width part having a small gap width, on the barycentric position side of the rotating body, and forming a region facing at least the radial bearing gap of the bearing member on the electroformed part made of deposited metal.

BEST MODE FOR CARRYING OUT THE INVENTION

A fluid dynamic bearing device and a motor equipped with the same according to a first embodiment of the present invention is hereinafter described in detail based on FIG. 1 to FIG. 6. Here, "upper and lower" direction referred to in the following description merely indicates the upper and lower direction in each figure for the sake of convenience, and does not limit the installing direction, the usage mode, and the like of the fluid dynamic bearing device. This is the same for other embodiments of the present invention shown in FIG. 7 and subsequent drawings.

FIG. 1 shows one configuration example of a fluid dynamic bearing device according to a first embodiment of the present invention. The fluid dynamic bearing device 1 shown in the figure supports the rotation of a spindle shaft in a motor incorporated in an HDD. The fluid dynamic bearing device 1 includes, as main components, a housing 2, a plurality of, or two bearing sleeves (first bearing sleeve 3, second bearing sleeve 4) herein fixed to the housing 2 at positions spaced apart from each other in an axial direction, a spacer member 8 disposed between the first and second bearing sleeves 3, 4, and a shaft member 5 inserted to an inner circumference of the first and second bearing sleeves 3, 4.

As hereinafter described, a first radial bearing part R1 is arranged between an inner circumferential surface 3a of the first bearing sleeve 3 and an outer circumferential surface 5a of the shaft member 5, and a second radial bearing part R2 is arranged between an inner circumferential surface 4a of the second bearing sleeve 4 and the outer circumferential surface 5a of the shaft member 5. A first thrust bearing part T1 is arranged between an upper end surface 3b of the first bearing sleeve 3 and a lower end surface 6b of a seal member 6, and a second thrust bearing part T2 is arranged between a lower end surface 4b of the second bearing sleeve 4 and an upper end surface 7b of a seal member 7.

The housing 2 is formed into, for example, a substantially cylindrical shape by injection molding a resin material, and a first inner circumferential surface 7a to which the first and second bearing sleeves 3, 4 and the spacer member 8 are fixed is formed into a straight cylindrical surface. Second and third inner circumferential surfaces 2b, 2c having a diameter larger than the first inner circumferential surface 7a are provided at both ends of the first inner circumferential surface 7a, and second and third inner circumferential surfaces 2b, 2c are connected to a first inner circumferential surface 2a by way of a step surface 2d, 2e, respectively.

For the base resin used in the resin material to form the housing 2, any type can be used as long as it can be injection molded regardless of whether amorphous resin or crystalline resin. For example, where polysulfone (PSU), polyethersulfone (PES), polyphenylsulfone (PPSU), polyetherimide (PEI), and the like are used for amorphous resin, and liquid crystal polymer (LCP), polyether ether ketone (PEEK), polybutylene telephtalate (PBT), polyphenylene sulfide (PPS), and the like are used for crystalline resin. These are obviously just examples, and other base resin can be used in view of usage environment etc. The type of filler to be filled to the base material is also not limited, and fiber filler such as glass fiber, whisker filler such as potassium titanate, scale-like filler such as mica, fiber or powder conductive filler such as carbon fiber, carbon black, black lead, carbon nano material, and metal powder can be used as fillers. Such fillers can be used alone or can be used by mixing two or more types.

In addition, the housing 7 can be made of soft metal material such as brass and aluminum alloy, and other metal materials.

The shaft member 5 is made of metal material such as stainless steel, and has a shaft shape of substantially the same diameter as a whole. The annular seal members 6, 7 serving as projecting parts are fixed to the shaft member 5 by an appropriate fixing means such as adhesion or press-fit adhesion (simultaneous use of press-fitting and adhesion). The seal members 6, 7 are projected to an outer diameter side from the outer circumferential surface 5a of the shaft member 5, and are accommodated on the inner circumferential side of the second and third inner circumferential surfaces 2b, 2c of the housing 2, respectively. In order to enhance the fixing strength of adhesive, circumferential grooves 5a1, 5a2 acting as adhesive pool are formed on the outer circumferential surface 5a of the shaft member 5 that constitutes the fixing positions of the seal members 6, 7. The seal members 6, 7 may be made of soft metal material such as brass or other metal materials, or may be made of resin material. One of the seal members 6, 7 may be integrally formed with the shaft member 5.

The outer circumferential surface 6a of the seal member 6 forms a seal space S1 of a predetermined capacity between itself and the second inner circumferential surface 2b of the housing 2, and the outer circumferential surface 7a of the seal member 7 forms a seal space S2 of a predetermined capacity between itself and the third inner circumferential surface 2c of the housing 2. In this embodiment, the outer circumferential surface 6a of the seal member 6 and the outer circumferential surface 7a of the seal member 7 are respectively formed into a tapered surface shape in which diameter thereof gradually narrows towards the exterior side of the housing 2. Thus, the seal spaces S1, S2 have a tapered shape gradually narrowing towards the interior side of the housing 2.

The first and second bearing sleeves 3, 4 are both formed into a cylindrical shape with a porous body formed of sintered metal, in particular, with a porous body of sintered metal having copper as main component, and are respectively fixed to the first inner circumferential surface 2a of the housing 2 by means of press-fitting, adhesion, press-fit adhesion, or the like. The bearing sleeves 3, 4 can be made of metal material such as copper alloy other than sintered metal. The first and second bearing sleeves 3, 4 are formed with different axial lengths from each other, and the axial length L1 of the first bearing sleeve 3 is formed larger than the axial length L2 of the second bearing sleeve 4 (L1>L2) in the present configuration example.

As shown in FIG. 2(B), a region that constitutes a radial bearing surface A of the first radial bearing part R1 is formed in the inner circumferential surface 3a of the first bearing sleeve 3, and a herringbone-shaped dynamic pressure groove 3a1 is formed in the radial bearing surface A. The radial bearing surface A is formed at the end on the side (upper side) away from the second bearing sleeve 4. A band-shaped convex part B is formed at an end on the opposite side (lower side) spaced apart from the radial bearing surface A in the axial direction of the inner circumferential surface 3a of the first bearing sleeve 3. The convex part B is formed into substantially the same diameter as a hill part that partitions and forms the dynamic pressure groove 3a1.

As shown in FIG. 2(A), a region that constitutes a thrust bearing surface of the first thrust bearing part T1 is formed in a partial or the entire annular region of the upper end surface 3b of the first bearing sleeve 3, and a herringbone-shaped dynamic pressure groove 3b1 are formed in the thrust bearing surface. Further, a plurality of (three in the illustrated example) axial grooves 3d1 arranged at equal interval in the circumferential direction are formed in the outer circumferential surface 3d.

As shown in FIG. 2(B), a region that constitutes a radial bearing surface A' of the second radial bearing part R2 is formed in the inner circumferential surface 4a of the second bearing sleeve 4, and a herringbone-shaped dynamic pressure groove 4a1 is formed in the radial bearing surface A'. As shown in FIG. 2(C), a region that constitutes a thrust bearing surface of the second thrust bearing part T2 is formed in a partial or the entire annular region of the lower end surface 4b of the second bearing sleeve 4, and a herringbone-shaped dynamic pressure groove 4b1 is formed in the thrust bearing surface. Further, a plurality of (three in the illustrated example) axial grooves 4d1 arranged at equal interval in the circumferential direction are formed in the outer circumferential surface 4d.

The cylindrical spacer member 8 made of soft metal such as brass and aluminum, resin material, or sintered metal is interposed between the first and second bearing sleeves 3, 4, and is fixed to the first inner circumferential surface 2a of the housing 2 by means of press-fitting, adhesion, press-fit adhesion and the like. The inner circumferential surface 8a of the spacer member 8 is formed into a diameter slightly larger than the inner circumferential surfaces 3a, 4a of the bearing sleeves 3, 4, and a radial bearing gap is not formed between the inner circumferential surface 8a and the shaft member 5 during the rotation of the shaft member 5 (bearing operation). Further, a plurality of (e.g., three) axial grooves 8d1 arranged at equal interval in the circumferential direction are formed in the outer circumferential surface 8d.

The fluid dynamic bearing device 1 including the above-mentioned component parts is assembled through the following processes.

First, the first and second bearing sleeves 3, 4 and the spacer member 8 are fixed to the first inner circumferential surface 2a of the housing 2 in a mode shown in FIG. 2. The ensuring of coaxiality between the bearing sleeves 3, 4 in time of fixation is carried out using an assembly pin P as shown in FIG. 3(A). Since the convex part B of substantially the same diameter as the radial bearing surface A is arranged on the lower end side spaced apart from the radial bearing surface A at the inner circumferential surface 3a of the first bearing sleeve 3, the coaxiality between both ends is reliably ensured at the first bearing sleeve 3 without degrading the posture. The ensuring of coaxiality between the first and second bearing sleeves 3, 4 is reliably carried out by using the assembly pin P.

Further, as shown enlarged in FIG. 3(B), when fixing the bearing sleeves 3, 4 and the spacer member 8 to the housing 2, fixation is made to the inner circumferential surface 2a with the axial position of the first bearing sleeve 3 being adjusted so that the upper end surface 3b of the first bearing sleeve 3 is in plane with the step surface 2d on the upper side of the housing 2d or is projected from the step surface 2d by a slight dimension δ2. As shown in the figure, if the upper end surface 3b of the first bearing sleeve 3 is projected from the step surface 2d by dimension δ2, the axial dimension between the lower end surface 6b of the seal member 6 and the step surface 2f becomes larger than a width δ1 of the thrust bearing gap of the first thrust bearing part T1. Although not illustrated, the second bearing sleeve 4 is also fixed to the first inner circumferential surface 2a of the housing 2 with the position adjustment similar to that of the first bearing sleeve 3 being performed.

As a result of adjusting the axial position of both bearing sleeves 3, 4 in the above-mentioned mode and fixing to the inner circumferential surface 2a of the housing 2. As shown in FIG. 1 and FIG. 2, a slight gap is sometimes formed between the lower end surface 3c of the first bearing sleeve 3 and the upper end surface 8b of the spacer member 8, and between the upper end surface 4c of the second bearing sleeve 4 and the lower end surface 8c of the spacer member 8. The gap is sometimes formed only on one side of the bearing sleeves 3, 4 depending on the axial direction of the first and second bearing sleeves 3, 4, and the spacer member 8, and the inner circumferential surface 2a of the housing 2. Alternatively, both of the bearing sleeves 3, 4 sometimes contact the spacer member 8.

The shaft member 5 is then inserted to the inner circumferential surfaces 3a, 4a of the first and second bearing sleeves 3, 4 and the inner circumferential surface 8a of the spacer member 8, and the seal members 6, 7 are fixed at predetermined positions of the shaft member 5. Any one of the seal members 6, 7 may be fixed to the shaft member 5 in advance before insertion or may be integrally formed with the shaft member 5.

After the assembly is completed through the above-mentioned processes, lubricating oil etc. is filled as lubricant fluid to the internal space of the housing 2 sealed with the seal members 6, 7 including an internal air hole of the bearing sleeves 3, 4 (internal air hole of porous body tissue). The lubricating oil can be filled by immersing the assembly completed fluid dynamic bearing device 1 in the lubricating oil in a vacuum bath and then being opened to atmospheric pressure.

In the fluid dynamic bearing device 1 of the above-mentioned configuration, when the shaft member 5 rotates, the radial bearing surface A of the inner circumferential surface 3a of the first bearing sleeve 3 faces the outer circumferential surface 5a of the shaft member 5 by way of the radial bearing gap. In the radial bearing surface A, the pressure of the lubricating oil filled in the radial bearing gap is increased by the dynamic pressure action of the dynamic pressure groove 3a1, and the shaft member 2 is non-contact supported in a freely rotating manner in the radial direction by such pressure. In the present configuration example, the radial bearing gap is formed between the convex part B and the outer circumferential surface 5a of the shaft member 5, and an oil film is formed in the radial bearing gap by the oil exuded from the first bearing sleeve 3, and hence the shaft member 5 is rotatably supported in the radial direction by the oil film. The dynamic pressure bearing and a cylindrical bearing constitute the first radial bearing part R1 that rotatably supports the shaft member 5 in the radial direction. The dynamic pressure bearing is constructed of the radial bearing surface A' in the second bearing sleeve 4 as well, and the second radial bearing part R2 that rotatably supports the shaft member 5 in the radial direction is constructed.

When the shaft member 5 rotates, the thrust bearing surface of the upper end surface 3b of the first bearing sleeve 3 faces the lower end surface 6b of the seal member 6 by way of the predetermined thrust bearing gap, and the thrust bearing surface of the lower end surface 4b of the second bearing sleeve 4 faces the upper end surface 7b of the seal member 7 by way of the predetermined thrust bearing gap. With the rotation of the shaft member 2, the pressure of the lubricating oil filled in each thrust bearing gap is increased by the dynamic pressure action of the dynamic pressure grooves 3b1, 4b1, and the shaft member 5 is non-contact supported in a freely rotating manner in both thrust directions. The first thrust bearing part T1 and the second thrust bearing part T2 non-contact supporting the shaft member 5 in a freely rotating manner in both thrust directions are thereby formed.

In the rotation of the shaft member 5, the seal spaces S1, S2 formed on the side of the outer circumferential surface 6a of the seal member 6 and the side on the outer circumferential surface 7a of the seal member 7 have a tapered shape gradually narrowing towards the inner side of the housing 2, as described above, and hence the lubricating oil in both seal spaces S1, S2 is drawn in the direction the seal space narrows, that is, towards the inner side of the housing 2 by the drawing action by the capillary force and the drawing action by centrifugal force in rotation. The leakage of the lubricating oil from the interior of the housing 2 is thereby effectively prevented. Further, the seal spaces S1, S2 have a buffer function of absorbing the amount of change in capacity involved in the change in temperature of the lubricating oil filled in the interior space of the housing 2, and the fluid level of the lubricating oil is always within the seal spaces S1, S2 within a range of the expected temperature change.

A series of circulating paths is formed inside the housing 2 by a fluid path formed by the axial groove 3d1 of the first bearing sleeve 3, a fluid path formed by the axial groove 4d1 of the second bearing sleeve 4, a fluid path formed by the axial groove 8d1 of the spacer member 8, each bearing gap (radial bearing gap of the first radial bearing part R1 and the second radial bearing part R2, thrust bearing gap of the first thrust bearing part T1 and the second thrust bearing part T2), and the gap between the inner circumferential surface 8a of the spacer member 8 and the outer circumferential surface 5a of the shaft member 5. As the lubricating oil filled in the interior space of the housing 2 flows and circulates through the circulating path, the pressure balance of the lubricating oil can be maintained, and at the same time, generation of air bubbles involved in local generation of negative pressure, leakage and vibration of the lubricating oil caused by the generation of air bubbles, and the like are prevented. One end of the fluid path formed by the axial groove 3d1 of the first bearing sleeve 3 and one end of the fluid path formed by the axial groove 4d1 of the second bearing sleeve 4 communicate to the seal spaces S1, S2, respectively, which is the atmosphere opened side. Thus, even when air bubbles mix in the lubricating oil for some reason, the air bubbles are discharged to the outside air opened side when circulating with the lubricating oil, and hence adverse affects by the air bubbles can be more effectively prevented.

Although not shown, the axial fluid paths formed between the bearing sleeves 3, 4 and the spacer member 8, and the housing 2 may be formed by arranging the axial groove in the inner circumferential surface 2a of the housing 2.

With the configuration described above, the load capability on the moment load can be enhanced by increasing the axial span between the radial bearing parts R1, R2 and enlargement of individual bearing sleeve can be prevented, and hence the bearing sleeves 3, 4 of desired accuracy can be easily manufactured. Since the first bearing sleeve 3 and the second bearing sleeve 4 have different axial lengths from each other, the difference in outer appearance is apparent, and hence assembly mistake can be reliably prevented and parts control can be simplified.

In the present configuration example, the convex part B having the same diameter as the radial bearing surface A is formed at the lower end in the axial direction spaced apart from the radial bearing surface A in the inner circumferential surface 3a of the first bearing sleeve 3 of increased axial length, and hence coaxiality can be reliably ensured between the radial bearing surfaces A, A' during assembly, and lowering in bearing performance due to lowering in this kind of accuracy can be prevented. The above description is made on the case of forming the convex part B into a continuous band-shape over the entire circumference of the inner circumferential surface 3a, but the convex part B can be intermittently arranged in the circumferential direction as long as coaxiality of the bearing sleeve can be reliably ensured.

FIG. 4 shows another configuration example (second configuration example) of the fluid dynamic bearing device according to the first embodiment of the present invention. A fluid dynamic bearing device 21 shown in the figure mainly differs from the fluid dynamic bearing device 1 described above in that the inner circumferential surface 2a of the housing 2 extends to the end surface of the housing 2 at even diameter, and the seal members 6, 7 have a relatively small diameter accompanied therewith. The above-mentioned configuration has the advantage in that the shape of the housing 2 can be simplified and the diameter can be reduced compared to the fluid dynamic bearing device 1 of the first configuration example. In this configuration example, the lower end surface 3c of the bearing sleeve 3 and an upper end surface 2c2 of a spacer part 2c contact with each other, and the upper end surface 4c of the bearing sleeve 4 and a lower end surface 2c3 of the spacer part 2c contact with each other. Other matters comply with the first configuration example, and hence common reference symbols are denoted and redundant disruption will is omitted.

In the above-mentioned description, the dynamic pressure groove of herringbone-shape is illustrated as the example of the dynamic pressure generating means of the radial bearing parts R1, R2 and the thrust bearing parts T1, T2, but the dynamic pressure groove may be of spiral-shape or other shapes. Alternatively, a so-called step bearing or a multi-circular arc bearing may be used for the dynamic pressure generating means.

FIG. 5 conceptually shows one configuration example of an information equipment spindle motor incorporating the fluid dynamic bearing device 1 shown in FIG. 1 of the fluid dynamic bearing device according to the first embodiment of the present invention. The spindle motor is used in a sever HDD, for example, and includes the fluid dynamic bearing device 1, a rotor (disk hub) 12 attached to the shaft member 5 of the fluid dynamic bearing device 1, and a stator coil 10 and a rotor magnet 11 facing each other by way of a gap in the direction of the radius (radial direction). The stator coil 10 is attached to an outer periphery of a bracket 9, and the rotor magnet 11 is attached to an inner circumference of the disk hub 12. The housing 2 of the fluid dynamic bearing device 1 is attached to the inner periphery of the bracket 9. The disk hub 12 holds one or a plurality of disks D such as magnetic disk. When current flows through the stator coil 10, the rotor magnet 11 rotates by the electromagnetic force between the stator coil 10 and the rotor magnet 11, whereby the disk hub 12 and the disk D held by the disk hub 12 integrally rotate with the shaft member 5.

The fluid dynamic bearing device described above is not limited to use in the spindle motor of disk device such as HDD, and is also preferably used in a motor where high speed rotation, and high load capability with respect to moment load is required such as fan motor.

FIG. 6 conceptually shows a fan motor incorporating the fluid dynamic bearing device 1 according to the first embodiment of the present invention, and among them, one example of a so-called radial gap fan motor in which the stator coil 10 and the rotor magnet 11 are faced to each other by way of the gap in the radius direction (radial direction). The motor in the illustrated example mainly differs in configuration from the spindle motor shown in FIG. 5 in that a rotor 13 fixed at an outer circumference of an upper end of the shaft member 5 has blades at the outer circumferential surface, and in that the bracket 9 has a function of a casing for accommodating each constituting parts of the motor. The other matters comply with the spindle motor shown in FIG. 5, and hence common reference symbols are denoted and redundant description is omitted.

A fluid dynamic bearing device and a motor equipped with the same according to a second embodiment of the present invention is described based on FIG. 7 to FIG. 12.

FIG. 7 conceptually shows one configuration example of an information equipment spindle motor incorporating the fluid dynamic bearing device according to the second embodiment of the present invention. The spindle motor is used in the disk drive such as HDD, and includes a fluid dynamic bearing device 101, a rotor (disk hub) 103 attached to a shaft member 102, and a stator coil 104 and a rotor magnet 105 facing each other by way of a gap in the radial direction. The stator coil 104 is attached to an outer periphery of a bracket 106, and the rotor magnet 105 is attached to the inner circumference of the disk hub 103. A housing 107 of the fluid dynamic bearing device 1 is attached to the inner periphery of the bracket 106. The disk hub 103 holds one or a plurality of disks D11 such as magnetic disk. When current flows through the stator coil 104, the rotor magnet 105 rotates by the electromagnetic force between the stator coil 104 and the rotor magnet 105, whereby the disk hub 103 and the disk D11 held by the disk hub 103 integrally rotate with the shaft member 102.

FIG. 8 shows one configuration example of the fluid dynamic bearing device according to the second embodiment of the present invention. The fluid dynamic bearing device 101 includes, as main component parts, a bearing member 108 on a fixed side, and a rotating body on a rotating side having the shaft member 102 to be inserted to the inner circumference of the bearing member 108. The rotating body in the present configuration example is constructed of the shaft member 102 and seal members 109, 110 disposed spaced apart at two locations in the axial direction of the shaft member 102. In the present configuration example, the bearing member 108 is constructed of two bearing sleeves 181, 181 disposed spaced apart in the axial direction, a spacer member 182 interposed between the bearing sleeves 181, 181, and the housing 107 having the bearing sleeves 181, 181 and the spacer member 182 fixed at the inner circumference.

In the fluid dynamic bearing device 101 shown in FIG. 8, a first radial bearing part R11 is arranged between an inner circumferential surface 181a of the upper bearing sleeve 181 and an outer circumferential surface 102a of the shaft member 102, and a second radial bearing part R12 is arranged between an inner circumferential surface 181a of the lower bearing sleeve 181 and the outer circumferential surface 102a of the shaft member 102. A first thrust bearing part T11 is arranged between an upper end surface 181b of the upper bearing sleeve 181 and a lower end surface 109b of the seal member 109, and a second thrust bearing part T12 is arranged between a lower end surface 181c of the lower bearing sleeve 181 and an upper end surface 110b of the seal member 110.

The shaft member 102 is made of metal material such as stainless steel. The shaft member 102 has a shaft shape of substantially the same diameter as a whole, and an escape part 102b having a diameter slightly smaller than other portions is formed at the intermediate portion. A concave part such as a circumferential groove 102c is formed at fixed positions of the seal members 109, 110 in the outer circumferential surface 102a of the shaft member 102. In the present embodiment, the shaft member 102 is a metal integrally processed article but may be a hybrid shaft of metal and resin (sheathe part is metal, core part is resin, and the like).

The housing 107 has a tubular shape opened at both ends, and an inner circumferential surface 107a thereof is formed into a straight cylindrical surface with a constant diameter in the axial direction. The housing 107 is a machine processed article made of metal material such as brass and aluminum or injection molded article of resin composition. When injection molding with the resin composition, the usable base resin is not particularly limited, and in addition to amorphous resin such as polysulfone (PSU), polyethersulfone (PES), polyphenylsulfone (PPSU), polyetherimide (PEI), and the like, crystalline resin such as liquid crystal polymer (LCP), polyether ether ketone (PEEK), polybutylene telephtalate (PBT), polyphenylene sulfide (PPS), and the like can be used. The type of filler to be filled to the base material is also not limited, and fiber filler such as glass fiber, whisker filler such as potassium titanate, scale-like filler such as mica, fiber or powder conductive filler such as carbon fiber, carbon black, black lead, carbon nano material, and metal powder can be used as fillers. Such filler can be used alone or can be used by mixing two or more types.

The bearing sleeves 181, 181 are both formed into a cylindrical shape with a porous body formed of sintered metal, in particular, with a porous body of sintered metal having copper as main component. The bearing sleeves 181, 181 can also be made of soft metal such as brass. An axial groove 181d1 is arranged at equal interval in a plurality of locations (three in the illustrated example) in the circumferential direction on the outer circumferential surface 181d of the bearing sleeve 181.

A region that constitutes a radial bearing surface A11 of the first and second radial bearing parts R11, R12 is formed in the inner circumferential surface 181a of the bearing sleeves 181, 181. Further, as shown in FIG. 9(A), a plurality of dynamic pressure grooves 181a1 arrayed in a herringbone-shape are formed symmetrically in the axial direction in the region to constitute the radial bearing surface A11. The dynamic pressure groove 181a1 may be arrayed to other known shapes such as spiral shape.

As shown in FIG. 9(B), for example, a first dynamic pressure groove region including a plurality of dynamic pressure grooves 181b1 arranged in a spiral shape are formed in a partial or the entire annular region of the upper end surface 181b of the bearing sleeves 181, 181. As shown in FIG. 9(C), for example, a second dynamic pressure groove region including a plurality of dynamic pressure grooves 181c1 arranged into a herringbone shape are formed in a partial or the entire annular region of the lower end surface 181c. In the present embodiment, the first dynamic pressure groove region of the upper bearing sleeve 181 constitutes a thrust bearing surface B11 of the first thrust bearing part T11, and the second dynamic pressure groove region of the lower bearing sleeve 181 constitutes the thrust bearing surface C11 of the second thrust bearing part T12. The above-mentioned dynamic pressure grooves 181a1, 181b1, and 181c1 can all be simultaneously formed with the molding of the bearing sleeve 181.

The cylindrical spacer member 182 is interposed between two bearing sleeves 181, 181. The spacer member 182 is made of metal material such as brass or aluminum, or resin material, and an inner circumferential surface 182a thereof is formed to a diameter larger than the inner circumferential surface 181a of the bearing sleeve 181. In the present embodiment, the spacer member 182 is arranged at substantially the middle in the axial direction of the inner circumference of the housing 107 with the upper end surface 182b contacting the lower end surface 181c of the upper bearing sleeve 181, and the lower end surface 182c contacting the upper end surface 181b of the lower bearing sleeve 181. An axial groove 182d1 is arranged at a plurality of locations (e.g., three locations) in the circumferential direction on the outer circumferential surface 82d of the spacer member 182.

The seal members 109, 110 are both formed into a ring shape with soft metal such as brass or other metal materials, or resin material, and is adhered and fixed to the outer circumferential surface 102a of the shaft member 102, for example. In adhesion and fixation, the adhesion strength with respect to the shaft member 102 of the seal members 109, 110 enhances as the adhesive applied to the shaft member 102 is filled and solidified in a circumferential groove 102c serving as adhesive pool.

The outer circumferential surface 109a of the seal member 109 forms a first seal space S11 of a predetermined capacity between the outer circumferential surface 109a and the inner circumferential surface 107a on the upper end opening side of the housing 107, and the outer circumferential surface 110a of the seal member 110 forms a second seal space S12 of a predetermined capacity between the outer circumferential surface 110a and the inner circumferential surface 107a on the lower end opening side of the housing 107. In this configuration example, the outer circumferential surface 109a of the seal member 109 and the outer circumferential surface 110a of the seal member 110 are respectively formed into a tapered surface shape in which diameter thereof gradually narrows towards the exterior side of the bearing device. Thus, the seal spaces S1, S12 have a tapered shape whose diameter gradually reduces in a direction of approaching each other (inner direction of housing 107). In the rotation of the shaft member 102, the lubricating oil in the seal spaces S11, S12 is drawn in the direction the seal space narrows (inner direction of housing 107) by the drawing action by the capillary force and the drawing action by centrifugal force in rotation. The leakage of the lubricating oil from the interior of the housing 107 is thereby effectively prevented. In order to reliably prevent oil leakage, a coated layer (not illustrated) made of oil repellent agent may be formed on the upper and lower end surfaces of the housing 107, the upper end surface 109c of the seal member 109, and the lower end surface 110c of the seal member 110.

The first and second seal spaces S11, S12 have a buffer function of absorbing the amount of change in capacity involved in the change in temperature of the lubricating oil filled in the interior space of the housing 107. The fluid level is always within the seal spaces S11, S22 within a range of the expected temperature change. In order to realize this, the sum of the capacities of the seal spaces S11, S12 is set larger than the amount of change in capacity involved in temperature change of the lubricating oil filled at least in the internal space.

The assembly of the fluid dynamic bearing device 101 having the above-mentioned configuration is carried out in the following manner.

The bearing sleeves 181, 181 and the spacer member 182 are fixed to the inner circumferential surface 107a of the housing 107 with appropriate means such as adhesion, press-fitting, welding and the like. After inserting the shaft member 102 to the inner circumference of the bearing sleeves 181, 181 and the space member 182, the seal members 109, 110 are adhered and fixed to the outer circumference of the circumferential groove 102c of the shaft member 102 while ensuing a predetermined axial gap so as to sandwich the bearing sleeves 181, 181 and the spacer member 182. After the assembly of the fluid dynamic bearing device 101 is completed in such manner, the lubricating oil etc. is filled as lubricant fluid to the internal space of the housing 107 sealed with the seal members 109, 110 including an internal air hole of the bearing sleeves 181, 181. The filling of lubricating oil can be conducted by immersing the assembly completed fluid dynamic bearing device 101 in the lubricating oil in a vacuum bath and then being opened to atmospheric pressure.

In the fluid dynamic bearing device 101 of the above-mentioned configuration, when the shaft member 102 rotates, the radial bearing surface A11 of the inner circumferential surface 181a of the both bearing sleeves 181, 181 faces the outer circumferential surface 102a of the shaft member 102 by way of the radial bearing gap. The dynamic pressure of the lubricating oil generates in each radial bearing gap with the rotation of the shaft member 102, and the shaft member 102 is non-contact supported in a freely rotating manner in the radial direction by such pressure. The radial bearing part R1 and the radial bearing part R2 for non-contact supporting the shaft member 102 in a freely rotating manner in the radial direction are thereby formed.

When the shaft member 102 rotates, the region (first dynamic pressure groove region) that constitutes the thrust bearing surface B11 of the upper end surface 181b of the upper bearing sleeve 181 faces the lower end surface 109b of the seal member 109 by way of the predetermined first thrust bearing gap, and the region (second dynamic pressure groove region) that constitutes the thrust bearing surface C11 of the lower end surface 181c of the lower bearing sleeve 181 faces the upper end surface 110b of the seal member 110 by way of the predetermined second thrust bearing gap. With the rotation of the shaft member 102, the dynamic pressure of the lubricating oil generates in each thrust bearing gap, and the shaft member 102 is non-contact supported in a freely rotating manner in both thrust directions by such pressure. The first thrust bearing part T11 and the second thrust bearing part T12 that non-contact support the shaft member 102 in a freely rotating manner in both thrust directions are thereby formed.

During the operation of the fluid dynamic bearing device 101, generation of air bubbles involved in local generation of negative pressure, leakage and vibration of the lubricating oil caused by the generation of air bubbles, and the like sometimes occur. In order to respond to this, in the present embodiment, a series of circulating paths is formed inside the fluid dynamic bearing device 101 by the axial groove 181d1 of both bearing sleeves 181, 181, the axial groove 182d1 of the spacer member 182, each bearing gap (radial bearing gap of first and second radial bearing parts R11, R12, and thrust bearing gap of first and second thrust bearing parts T11, t12), and the gap between the inner circumferential surface 182a of the spacer member 182 and the outer circumferential surface 102a of the shaft member 102, and hence the lubricating oil flows and circulates through the circulating path during the operation of the bearing. The above mentioned drawbacks are thus effectively prevented. One end of the axial groove 181d1 of both bearing sleeves 181 are respectively communicated to the seal spaces S11, S12, which is the atmosphere opened side. Thus, even when air bubbles mix in the lubricating oil for some reason, the air bubbles are discharged to the outside air opened side when circulating with the lubricating oil, and hence adverse affects by the air bubbles can be more effectively prevented.

In the configuration described above, the bearing member 108 is formed using the bearing sleeves 181, 181 having the first dynamic pressure groove region including the dynamic pressure groove 181b1 on the upper end surface 181b and the second dynamic pressure groove region including the dynamic pressure groove 181c1 on the lower end surface 181c, in other words, using two of the same bearing sleeves. Therefore, the bearing sleeves 181, 181 can be assembled to the housing 107 without being aware of the upper and lower position relationship, and the fluid dynamic bearing device 101 with excellent moment rigidity can be easily obtained at low cost by arranging the thrust bearing parts T11, T12 on both end sides of the bearing member 108 while avoiding drawbacks such as the fluid dynamic bearing device 101 being unusable due to assembly mistake. In particular, in the present configuration example, since the first dynamic pressure groove region is formed by arraying the dynamic pressure groove 181b1 of the upper end surface 181b in a spiral shape and the second dynamic pressure groove region is formed by arraying the dynamic pressure groove 181c1 of the lower end surface 181c in a herringbone shape, the distinction of both end surfaces is enhanced, and the matter of mistaking the upper and the lower side when assembling each bearing sleeve 181 is reliably prevented.

Since two types of bearing sleeves can be put together into one type of bearing sleeve, the part unit price can be reduced, and Further, the management cost of the parts can be reduced.

In the present configuration example, the dynamic pressure groove arrayed in a spiral shape is formed in the thrust bearing surface B11 (first dynamic pressure groove region) facing the first thrust bearing gap of the first thrust bearing part T11, and the dynamic pressure groove arrayed in the herringbone shape is formed in the thrust bearing surface C11 (second dynamic pressure groove region) facing the second thrust bearing gap of the second thrust bearing part T12. But the first dynamic pressure groove region and the second dynamic pressure groove region may be constructed of dynamic pressure grooves arrayed to the same shape with different number of grooves and angle of slope as long as distinction can be ensured.

Further, the arraying shape of the dynamic pressure grooves of the first dynamic pressure groove region and the second dynamic pressure groove region is determined focusing only on distinction, but the arraying shape, the number of grooves, and the like of the dynamic pressure groove can be differed according to the pressure required in the first thrust bearing part T11 and the second thrust bearing part T12.

In the present configuration example, the spacer member 182 of non-porous body is interposed between the bearing sleeves 181, 181, and hence the amount of lubricating oil to be filled inside the bearing can be reduced. The axial dimension of the seal members 109, 110 thus can be shortened, and the bearing span of the radial bearing parts R11, R12 can be increased.

Although not shown, one of the seal members 109, 110 can be integrally formed with the shaft member 102 in the fluid dynamic bearing device 101 of the above-mentioned configuration, where the assembly of the fluid dynamic bearing device 101 can be further simplified with such configuration.

In the above description, a case of arranging the dynamic pressure generating means (dynamic pressure groove) for generating the fluid dynamic pressure in the radial bearing gap on the inner circumference of the bearing sleeve 181 has been described, but the dynamic pressure groove may be arranged on the outer circumferential surface 102a of the opposing shaft bearing 102 by way of the radial bearing gap. In this case, the upper and lower position relationship of the bearing sleeves does not affect the rotational performance, and the dynamic pressure groove for forming the first radial bearing part R1 and the dynamic pressure groove for forming the second radial bearing part R2 may have different shape etc. from each other.

FIG. 10 shows another configuration example (second configuration example) of the fluid dynamic bearing device according to the second embodiment of the present invention. A fluid dynamic bearing device 121 shown in the figure mainly differs in configuration from the fluid dynamic bearing device 101 shown in FIG. 8 in that the bearing member 108 is constructed of two bearing sleeves 181, 181 and the housing 7. When arranging the dynamic pressure groove on the inner circumferential surface 181a of the bearing sleeve 181, assembly can be carried out without being concerned with the upper and lower positions of both bearing sleeves 181, 181, similar to the configuration shown in FIG. 8 by making the shape of the dynamic pressure groove 181a2 as a plurality of axial groove shape arranged at equal interval in the circumferential direction as shown in FIG. 11, for example. The radial bearing parts R11, R12 constructed of the dynamic pressure groove 181a2 of this type are so-called step bearings. Obviously, when the dynamic pressure groove for forming the radial bearing parts R11, R12 is arranged on the outer circumferential surface 102a of the shaft bearing 102, the shape can be freely set, similarly to the above. Note that, other configurations comply with the first configuration example shown in FIG. 8, and hence common reference symbols are denoted and redundant description are omitted.

In the fluid dynamic bearing devices 101, 121 described above, the radial bearing parts R11, R12 can be constructed of a so-called multi-circular arc bearing in which a plurality of circular arc surfaces is formed in a region to become the radial bearing surface. Other than generating the dynamic pressure action of the lubricating oil by the dynamic pressure groove of herringbone shape and spiral shape as described above, as the thrust bearing parts T11, T12 there may be adopted a so-called step bearing, or a so-called wave bearing (similar to step type but of wave type) in which a plurality of radial grooves is arranged at a predetermined interval in the circumferential direction in a region to become the thrust bearing surface.

In the above description, the lubricating oil has been described as the example of the fluid filling the interior of the fluid dynamic bearing device 101, 121, but fluid capable of generating dynamic pressure in each bearing gap such as gas including air, magnetic fluid, and the like can be used.

A case of incorporating the fluid dynamic bearing device 101 according to the present embodiment in the spindle motor of the disk device has been described, but the fluid dynamic bearing device 101 according to the present embodiment is also preferably used in a motor where high speed rotation, and high moment rigidity are required such as fan motor, other than the spindle motor for information equipment.

FIG. 12 conceptually shows one example of a fan motor incorporating the fluid dynamic bearing device 101 according to the second embodiment of the present invention, and among them, one example of a so-called radial gap fan motor in which a stator coil 104 and a rotor magnet 105 are faced to each other by way of a gap in a radius direction (radial direction). The motor in the illustrated example mainly differs in configuration with the spindle motor shown in FIG. 7 in that a rotor 133 fixed to an outer circumference of an upper end of the shaft member 102 has blades at the outer circumferential surface and in that a bracket 136 has a function of a casing for accommodating each constituting parts of the motor. Other configurations comply with the motor shown in FIG. 7, and hence common reference symbols are denoted and redundant description are omitted.

A fluid dynamic bearing device and a motor equipped with the same according to a third embodiment of the present invention is described based on FIG. 13 to FIG. 20.

FIG. 13 conceptually shows one configuration example of an information equipment spindle motor incorporating the fluid dynamic bearing device according to the third embodiment of the present invention. The spindle motor is used in the disk drive such as HDD, and includes a fluid dynamic bearing device 201 non-contact supporting a rotating body 202 including a shaft member 206 in a radial direction, a drive unit 204 including a stator coil 204a and a rotor magnet 204b facing each other by way of a gap in a radial direction, and a bracket 205. A hub 203 is attached to the shaft member 206, and the rotor magnet 204b is fixed to the hub 203. The stator coil 204a is fixed to the bracket 205. A housing 210 of the fluid dynamic bearing device 201 is fixed to the inner periphery of the bracket 205. As shown in the figure, the hub 203 holds one or a plurality of (two in FIG. 13) disks D21. When current flows through the stator coil 204a in the disk drive constituted as above, the rotor magnet 204b rotates by the electromagnetic force between the stator coil 204a and the rotor magnet 204b, whereby the disk D21 fixed to the hub 203 integrally rotates with the shaft member 206.

FIG. 14 shows one example (first configuration example) of the fluid dynamic bearing device 201 according to the third embodiment of the present invention. The fluid dynamic bearing device 201 shown in the figure includes, as main component parts, a bearing member 209 including a plurality of bearing sleeves, and a rotating body 202 including the shaft member 206 to be inserted to the inner circumference of the bearing member 209.

The bearing member 209 is constructed of a housing 210, and a plurality of bearing sleeves, which are first bearing sleeve 211 and second bearing sleeve 212 herein, fixed to the inner circumference of the housing 210.

The housing 210 is made of metal material or resin material, and includes a small diameter surface 210a, and large diameter surfaces 210b, 210c, which are positioned at both ends in the axial direction of the small diameter surface 210a and have a relatively large diameter compared to the small diameter surface 210a. The first bearing sleeve 211 and the second bearing sleeve 212 are arranged lined in the axial direction at the inner circumference of the small diameter surface 210a. The large diameter surfaces 210b, 210c are connected to the small diameter surface 210a by way of step-difference surfaces 210d, 210e, respectively.

The shaft member 206 is made of metal material such as stainless steel, and has a shaft shape of substantially the same diameter as a whole. The annular seal members 207, 208 are fixed to the outer circumferential surface 206a of the shaft member 206 by an appropriate fixing means such as adhesion. In the present configuration example, the shaft member 206 having the seal members 207, 208 fixed to the outer circumference thereof, the hub 203 fixed to the shaft member 206, the rotor magnet 204b attached to the hub 203, the disk D21, and the clamper (not shown) for fixing the disk D21 to the hub 203 constitute the rotating body 202. The axial barycentric position of the rotating body 202 of such a configuration is on the upper side (side close to hub 203) than an intermediate position in the axial direction of the bearing member 209 in the configuration example.

The seal members 207, 208 are projected to the outer diameter side from the outer circumferential surface 206a while being fixed to the shaft member 206, and are respectively accommodated inside (inner circumference of large diameter surface 210b, 210c) the housing 210. Various means such as adhesion, press-fitting, and simultaneous use of adhesion and press-fitting can be used as a means of fixing the seal members 207, 208 to the shaft member 206. The enhancement of the adhesion strength of the seal members 207, 208 with respect to the shaft member 206 is achieved by arranging circumferential grooves 206a1, 206a2 that become the adhesive pool at a location to be fixed with the seal members 207, 208 of the outer circumferential surface 206a of the shaft member 206. The seal members 207, 208 may be made of soft metal material such as brass and other metal material, or may be made of resin material. One of the seal members 207, 208 may be integrally formed with the shaft member 206. Thus, when one of the seal members is integrally formed with the shaft member, for example, one of the seal members can be injection molded with resin with the shaft member 206 made of metal being as the insert part.

The outer circumferential surface 207a of the seal member 207 forms a first seal space S21 of a predetermined capacity between the outer circumferential surface 207a and the large diameter surface 210b of the housing 210, and the outer circumferential surface 208a of the seal member 208 forms a second seal space S22 of a predetermined capacity between the outer circumferential surface 208a and the large diameter surface 210c of the housing 210. In this configuration example, the outer circumferential surface 207a of the seal member 207 and the outer circumferential surface 208a of the seal member 208 are respectively formed into a tapered shape in which diameter thereof gradually narrows towards the exterior side of the housing 210. Thus, the seal spaces S21, S22 have a tapered shape gradually narrowing towards the interior side (side of first bearing sleeve 211) of the housing 210.

Among a plurality of bearing sleeves constituting the bearing member 209, the first bearing sleeve 211 is formed into a cylindrical shape with a porous body made of sintered metal. In this embodiment, the first bearing sleeve 211 is formed into a cylindrical shape with a porous body of sintered metal having copper as main component, and is fixed to the inner circumferential surface (small diameter surface 210a) of the housing 210 through means such as press-fitting, adhesion, or press-fit adhesion. The first bearing sleeve 211 can be formed with a porous body made of non-metal material such as resin and ceramic, or can be made of material having structure without internal hole or with only a hole of a size the lubricating oil cannot go in or out other than the porous body such as sintered metal. Similar material can be selected for the second bearing sleeve 212.

A plurality of radial bearing surfaces A21, A22 is formed spaced apart in the axial direction at the inner circumferential surface 211a of the first bearing sleeve 211. In the present example, a region (dynamic pressure generating part) in which a plurality of dynamic pressure grooves 211a1 is arrayed into a herringbone shape is formed on the upper radial bearing surface A21, and a region (dynamic pressure generating part) in which a plurality of dynamic pressure grooves 211a2 is arrayed into a herringbone shape is formed on the lower radial bearing surface A22. The radial bearing surfaces A21, A22 face the outer circumferential surface 206a of the shaft member 206, in which the radial bearing gap of the first and second radial bearing parts R21, R22 to be hereinafter described is formed with respect to the outer circumferential surface 206a during the rotation of the shaft member 206 (see FIG. 14).

Among a plurality of bearing sleeves constituting the bearing member 209, the second bearing sleeve 211 is formed into a cylindrical shape with a porous body made of sintered metal, for example, and is axially arranged on one side (lower side) of the first bearing sleeve 211. In this embodiment, the second bearing sleeve 212 is formed into a cylindrical shape with a porous body of sintered metal having copper as main component, and is fixed to the small diameter surface 210a of the housing 210 through means such as press-fitting, adhesion, or press-fit adhesion. Therefore, in the present embodiment, the first bearing sleeve 211 is arranged in a region on relatively the upper side of the second bearing sleeve 212 at the inner circumference of the housing 210. Specifically, the intermediate position in the axial direction of the radial bearing parts R21, R22 respectively formed between the radial bearing surfaces A21, A22 of the first bearing sleeve 211 and the outer circumferential surface 206a of the shaft member 206 facing thereto is on the upper side (side close to hub 203) of the intermediate position in the axial direction of the bearing member 209.

A thrust bearing surface B21 is formed in the entire or a partial region of the lower end surface 212b of the second bearing sleeve 212. In the present configuration example, as shown in FIG. 16, a region in which a plurality of dynamic pressure grooves 212b1 is arrayed into a herringbone shape (in other words, a plurality of dynamic pressure grooves 212b1 having a bent portion is arrayed in a circumferential direction) is formed. The thrust bearing surface B21 faces the upper end surface 207b of the seal member 207 fixed to the shaft member 206, and a thrust bearing gap of the first thrust bearing part T21 to be hereinafter described is formed between the thrust bearing surface B21 and the upper end surface 207b of the seal member 207 during the rotation of the shaft member 206 (see FIG. 14).

A thrust bearing surface C21 is formed in the entire or a partial region of the upper end surface 211b of the first bearing sleeve 211. In the present configuration example, as shown in FIG. 17, for example, a region in which a plurality of dynamic pressure grooves 211b1 is arrayed into a herringbone shape is formed. The thrust bearing surface C21 faces the lower end surface 208b of the seal member 208 fixed to the shaft member 206, and a thrust bearing gap of the second thrust bearing part T22 to be hereinafter described is formed between the thrust bearing surface C21 and the lower end surface 208b of the seal member 208 during the rotation of the shaft member 206 (see FIG. 14).

In this case, the inner diameter dimension (diameter dimension of the inner circumferential surface 212a of the second bearing sleeve 212 is larger than the inner diameter dimension of the first bearing sleeve 211. Only the inner circumferential surface 211a of the first bearing sleeve 211 becomes the radial bearing surfaces A21, A22 in a state the shaft member 206 is inserted to the inner circumferences of the first bearing sleeve 211 and the second bearing sleeve 212.

A plurality of (three in the illustrated example) axial grooves 211d1, 212d1 is formed at equal interval in the circumferential direction at the outer circumferential surfaces 211d, 212d of each bearing sleeves 211, 212. Thus, a fluid path capable of communicating the thrust bearing parts T21, T22 formed spaced apart in the axial direction is thereby formed.

The fluid dynamic bearing device 201 having the above-mentioned configuration is assembled through the following processes.

First, the first bearing sleeve 211 is adhered and fixed to the small diameter surface 210a of the housing 210. In this case, the upper end surface 211b of the first bearing sleeve 211 is fixed to the small diameter surface 210a while being positioned in the axial direction so as to be in plane with the step-difference surface 210e of the housing 210 positioned on the outer diameter side or to be on the upper side in the axial direction (side close to lower end surface 208b of the seal member 208) than the step-difference surface 210e. As a result, only the thrust bearing surface C21 arranged at the upper end surface 211b of the first bearing sleeve 211 can form the second thrust bearing part T22 between the thrust bearing surface C21 and the lower end surface 208b of the seal member 208.

The second bearing sleeve 212 is introduced to the inner circumference of the small diameter surface 210a from the lower end side of the housing 210 (one side in the axial direction of the first bearing sleeve 211). The axial position with respect to the housing 210 of the second bearing sleeve 212 is determined so that the separated distance in the axial direction from the lower end surface 212*b* of the second bearing sleeve 212 disposed with the thrust bearing surface B21 to the upper end surface 211*b* of the first bearing sleeve 211 disposed with the thrust bearing surface C21 takes a predetermined value, and the second bearing sleeve 212 is fixed to the inner diameter surface 210*a* of the housing 210 at the above-mentioned position. The assembly of the bearing member 209 is then completed.

Thus, by using a member in which both radial bearings S21, A22 are put together into one bearing sleeve (first bearing sleeve 211), the coaxiality between both radial bearing surfaces A21, A22 can be finished at high accuracy by simply enhancing the molding accuracy when forming both radial bearing surfaces A21, A22 at the first bearing sleeve 211. Thus, compared to when positioning and fixing members in which both radial bearing surfaces A21, A22 are arranged on different bearing sleeves to the housing 210 as in the prior art, the coaxiality can be easily managed. Compared to when performing coaxial alignment between the inner circumferential surfaces (radial bearing surfaces) among the plurality of sleeves, the working efficiency is enhanced, and hence the processing cost can be reduced.

In the present configuration example, the first bearing sleeve 211 with the plurality of radial bearing surfaces A21, A22 is arranged on the side relatively close to the axial barycentric position of the rotating body 202 as opposed to the second bearing sleeve 212 without the radial bearing surface. According to such configuration, the separated distance in the axial direction between the center in the axial direction of the radial bearing parts R21, R22 formed between each radial bearing surface A21, A22 and the outer circumferential surface 206*a* of the shaft member 206 facing thereto, and the center of gravity of the rotating body 202 is reduced, and the moment rigidity of the fluid dynamic bearing device 201 can be improved.

Further, since two thrust bearing surfaces B21, C21 are arranged on different bearing sleeves from each other in the present configuration example, the separated distance in the axial direction can be increased compared to when the thrust bearing surfaces B21, C21 are formed on a single bearing sleeve. Thus, the moment rigidity can be improved with such configuration also. In particular, the separated distance in the axial direction of the thrust bearing surfaces B21, C21 can be increased as much as possible by arranging the thrust bearing surfaces B21, C21 respectively at the lower end surface 212*b* serving as the first end surface positioned at the most end side (e.g., lower end side) in the axial direction and the upper end surface 211*b* serving as the second end surface most spaced apart from the lower end surface 212*b* in the axial direction, as in the present configuration example, whereby the moment rigidity can be further improved.

In the present configuration example, the second bearing sleeve 212 is positioned and fixed with respect to the housing 210 with the lower end surface 211*c* of the first bearing sleeve 211 and the upper end surface 212*c* of the second bearing sleeve 212 facing thereto being contacted, but the second bearing sleeve 212 can be positioned and fixed in other modes. For instance, assuming the variation degree in the axial dimension between the first bearing sleeve 211 and the second bearing sleeve 212, the axial dimension of both bearing sleeves 211, 212 and the axial dimension of the small diameter surface 210*a* of the housing 210 can be set in advance such that a slight gap forms between the bearing sleeves 211, 212 (between lower end surface 211*c* and upper end surface 212*c*). Obviously, the first bearing sleeve 211 can be fixed to the housing 210 after positioning and fixing the second bearing sleeve 212 to the housing 210 in advance.

After assembling the bearing member 209 as described above, the shaft member 206 is inserted to the inner circumference of each bearing sleeve 211, 212, and the seal members 207, 208 are fixed to the predetermined position of the shaft member 206. In this case, the sum of the thrust bearing gaps of each thrust bearing part T21, T22 to be hereinafter described is set within a predetermined range by fixing each seal member 207, 208 to the shaft member 206 with the separated distance in the axial direction from the upper end surface 207*b* of one seal member 207 to the lower end surface 208*b* of the other seal member 208 being managed to a predetermined value. Note that, one of either seal member 207, 208 may be fixed to the shaft member 206 in advance before insertion or may be integrally formed to the shaft member 260.

After assembly is completed through the above-mentioned processes, lubricating oil etc. is poured as lubricant fluid to the internal space of the housing 210 sealed with the seal members 207, 208. The internal space of the bearing member 209 including internal hole (internal hole of porous body tissue) of each bearing sleeve 211, 212 is filled with lubricating oil. The lubricating oil is filled by immersing the assembly completed fluid dynamic bearing device 201 in the lubricating oil in the vacuum bath and then being opened to atmosphere.

In the fluid dynamic bearing device 201 of the above-mentioned configuration, two radial bearing surfaces A21, A22 formed at the inner circumferential surface 211*a* of the first bearing sleeve 211 face the outer circumferential surface 206*a* of the shaft member 206 by way of the radial bearing gap during the rotation of the shaft member 206 (rotating body 202). The lubricating oil of the radial bearing gap is pushed towards the center side in the axial direction of the dynamic pressure groove arranged at each radial bearing surface A21, A22 with the rotation of the shaft member 206, and the pressure thereof rises. The first radial bearing part R21 and the second radial bearing part R22 non-contact supporting the shaft member 206 (rotating body 202) in the radial direction are respectively formed by such dynamic pressure action of dynamic pressure grooves 211*a*1, 211*a*2 (see FIG. 14).

At the same time, an oil film of the lubricating oil is formed by the dynamic pressure action of the dynamic pressure grooves 212*b*1, 211*b*1 arranged at each thrust bearing surface B21, C21 in the thrust bearing gap between the thrust bearing surface B21 formed at the lower end surface 212*b* of the second bearing sleeve 212 and the upper end surface 207*b* of the seal member 207 facing thereto, and in the thrust bearing gap between the thrust bearing surface C21 formed at the upper end surface 211*b* of the first bearing sleeve 211 and the lower end surface 208*b* of the seal member 208 facing thereto. The first thrust bearing part T21 and the second thrust bearing part T22 non-contact supporting the shaft member 206 (rotating body 202) in both thrust directions are respectively formed by the pressure of the oil film (see FIG. 14).

As described above, since the seal spaces S21, S22 formed on the side on the outer circumferential surface 207*a* of the seal member 207 and the side on the outer circumferential surface 208*a* of the seal member 208 have a tapered shape gradually narrowing towards the interior side of the housing 210, the lubricating oil in the seal spaces S21, S22 is drawn in the direction the seal space narrows, that is, towards the interior side of the housing 210 with the drawing action by the capillary force and the drawing action by the centrifugal force in rotation. The leakage of the lubricating oil from the interior of the housing 210 is thereby effectively prevented. The seal spaces S21, S22 have a buffer function of absorbing the amount of change in capacity involved in the change in temperature of the lubricating oil filled in the interior space of the housing 210, and the fluid level of the lubricating oil is always within the seal spaces S21, S22 within a range of the expected temperature change.

According to the presence of the fluid path formed by the axial grooves 211d1, 212d1 of each bearing sleeve 211, 212, the pressure difference can be resolved as fast as possible even when the pressure of the lubricating oil becomes unbalanced, and generation of air bubbles involved in local generation of negative pressure, leakage and vibration of the lubricating oil caused by the generation of air bubbles, and the like can be prevented. One end of the fluid path formed by the axial groove 211d1 of the first bearing sleeve 211 and one end of the fluid path formed by the axial groove 212d1 of the second bearing sleeve 212 communicate to the seal spaces S21, S22, respectively, which is the atmosphere opened side. Thus, even when air bubbles mix in the lubricating oil for some reason, the air bubbles are discharged to the outside air opened side when circulating with the lubricating oil, and hence disadvantages that arise with mixing of air bubbles can be more effectively prevented.

One configuration example of the fluid dynamic bearing device according to a third embodiment of the present invention has been described in detail above, but the present invention is not limited to such configuration example, and can be applied to the fluid dynamic bearing device having other configurations.

A case where the first bearing sleeve 211 is disposed in the upper region (region on seal member 208 side) of the housing 210 relatively with respect to the second bearing sleeve 212 in the inner circumference of the housing 210 has been described, but may be disposed on the opposite side (side on seal member 207 side) depending on the axial barycentric position of the rotating body 202. In other words, depending on the type of equipment used by incorporating the fluid dynamic bearing device 201, the barycentric position of the rotating body 202 may be on the lower side (side distant from the hub 203) of the intermediate position in the axial direction of the bearing member 209. In such case, the first bearing sleeve 211 is disposed relatively at the lower region (region on seal member 207 side) of the housing 210 than the second bearing sleeve 212, and hence the separated distance in the axial direction between the axial center of the radial bearing parts R21, R22 and the center of gravity of the rotating body 202 is reduced, whereby high moment rigidity can be obtained.

Further, a case where the second bearing sleeve 212 without the radial bearing surface at the inner circumference is formed as a separate body from the housing 210 has been described, but the second bearing sleeve 212 and the housing 210 may be integrally formed. FIG. 18 shows one example where a sleeve shaped projecting part 210f projecting towards the inner diameter side from the small diameter surface 210a of the housing 210 is integrally formed with the housing 210. In this case, the inner diameter dimension of the projecting part 210f (radial dimension of inner circumferential surface 210f1) is larger than the inner diameter dimension of the first bearing sleeve 211. Thus, similar to the above-mentioned configuration example, only the inner circumferential surface 211a of the first bearing sleeve 211 becomes the radial bearing surfaces A21, A22 with the shaft member 206 (see FIG. 14) being inserted to the inner circumference of the first bearing sleeve 211 and the projecting part 210f of the housing 210. The thrust bearing surface B21 of a shape shown in FIG. 16, for example, is formed at the lower end surface 210f2 of the projecting part 210f. In this embodiment, the inner circumferential surface 210f1 of the projecting part 210f and the large diameter surface 210b of the housing 210 connect each other by way of the lower end surface 210f2. In the illustrated example, an axial pass-through hole 210f4 is formed in the projecting part 210f, and the pass-through hole 210f4 and the axial groove 211d1 form a fluid path.

According to such configuration, the number of components can be further reduced, and the assembly process of the bearing member 209 only includes positioning and fixation of the first bearing sleeve 211, and hence the working process can be simplified.

The bearing member 209 may further include a third bearing sleeve not including radial bearing surfaces A21, A22 in the inner circumference thereof. FIG. 19 shows one example, where the bearing member 209 has a configuration including a housing 210 with the first bearing sleeve 211 and the projecting part 210f serving as the second bearing sleeve, and including a third bearing sleeve 213 at the lower end side of the projecting part 210f (second bearing sleeve). In the figure, the inner diameter dimension of the projecting part 210f and the inner diameter dimension of the third bearing sleeve 213 are both larger than the inner diameter dimension of the first bearing sleeve 211. Thus, similar to the above-mentioned configuration example, only the inner circumferential surface 211a of the first bearing sleeve 211 can become the radial bearing surfaces A21, A22. The thrust bearing surface B21 is formed at the lower end surface 213b of the third bearing sleeve 213. An axial groove 213d1 is formed at the outer circumferential surface 213d of the third bearing sleeve 213, and the axial groove 213d1, the pass-through hole 210f4 of the projecting part 210f, and the axial groove 211d1 of the first bearing sleeve 211 form the fluid path described above.

According to such configuration, ample lubricating oil can be stably supplied to each bearing gap since positioning of individual bearing sleeves 211, 213 with respect to the housing 210 is facilitated, and all thrust bearing surfaces B21, C21 are made of sintered metal. Thus, high oil film formation capability can be stably fulfilled while preventing oil lacking in the bearing gap as much as possible. The oil amount of the lubricating oil filled in the bearing internal space can be adjusted by integrally forming one part of the bearing sleeve with the housing 210.

A case where the inner circumferential surface of the housing 210 has a different-diameter shape (e.g., small diameter surface 210a and large diameter surfaces 210b, 210c) has been described above, but obviously, the housing with other shapes and the bearing member 209 including the same can be used. FIG. 20 shows one example that differs in configuration from the fluid dynamic bearing device 201 shown in FIG. 14 in that the inner circumferential surface of the housing 210 has an even diameter (has inner circumferential surface 210g of constant diameter), and accordingly the seal members 207, 208 have a relatively small diameter. In this case, advantages that the shape of the housing 210 is simplified and miniaturized are obtained by using the housing 210 of such shape.

Moreover, a case where the array region (dynamic pressure generating part) of the dynamic pressure grooves 211a1, 211a2 is formed in the inner circumferential surface 211a of the first bearing sleeve 211 including the radial bearing surfaces A21, A22, the upper end surface 211b including the thrust bearing surface C21, or the lower end surface 212b of the second bearing sleeve 212 including the thrust bearing surface B21 has been described, but is not limited thereto. For instance, the dynamic pressure generating part including the dynamic pressure grooves 211a1, 211a2 can be formed at the outer circumferential surface 206a of the shaft member 206 facing each radial bearing surface A21, A22, or the dynamic pressure generating part including the dynamic pressure groove 212b1, 211b1 can be formed at the upper end surface 207b of the seal member 207 or at the lower end surface 208b of the seal member 208 facing the respective thrust bearing surfaces B21, C21. Similarly, the dynamic pressure generating part of the mode described below is not limited to being formed on the side of the bearing member 209, and can be formed on the side of the opposing shaft member 206 or each seal member 207, 208.

A configuration of generating the dynamic pressure action of the lubricating fluid by a plurality of dynamic pressure grooves arrayed in a herringbone shape has been illustrated above as the radial bearing parts R21, R22 and the thrust bearing parts T21, T22, but the present invention is not limited thereto.

For instance, although not shown, as the radial bearing parts R21, R22, there may be adopted a so-called step dynamic pressure generating part in which the axial groove is arranged at a plurality of locations in the circumferential direction, or a so-called multi-circular arc bearing in which a plurality of circular arc surfaces is arranged in the circumferential direction, and a wedge shaped radial gap (bearing gap) is formed between the radial bearing parts R21, R22 and the opposing outer circumferential surface 206a of the shaft member 206.

Although not illustrated, one or both of the thrust bearing parts T21, T22 may also be formed of a so-called step bearing or a wave bearing (similar to step type but of wave type) in which a plurality of radial groove shaped dynamic pressure grooves are arranged at a predetermined interval in the circumferential direction in the region that constitutes the thrust bearing surface B21, C21. Obviously, there may be adopted the arraying shape of the dynamic pressure grooves 212b1, 211b1 in each thrust bearing surface B21, C21 to be a spiral shape.

A configuration in which the shaft member 206 rotates and the bearing member 209 supports the same has been described above, but the present invention is also applicable to a configuration in which the bearing member 209 rotates and the shaft member 206 supports the same.

The lubricating oil has been described by way of example as the fluid filling the interior of the fluid dynamic bearing device 201 and causing dynamic pressure action of the fluid in the radial bearing gap and the thrust bearing gap, but other fluids capable of causing dynamic pressure action in each bearing gap such as gas including air, lubricant agent having fluidity such as magnetic fluid, or lubricating grease may be used.

Hereinafter, a fluid dynamic bearing device according to a fourth embodiment of the present invention is described based on FIG. 21 to FIG. 31.

FIG. 21 is a cross-sectional view with axis showing one example (first configuration example) of a fluid dynamic bearing device 301 according to the fourth embodiment of the present invention. The fluid dynamic bearing device 301 shown in the figure is used by being incorporated in the spindle motor of HDD and the like, and includes, as main component parts, a bearing member 305 and a rotating body 302 including a shaft member 303 to be inserted to the inner circumference of the bearing member 305. The details are hereinafter described, but the fluid dynamic bearing device 301 shown in the figure has a configuration in which a radial bearing gap is arranged spaced apart at two locations in the axial direction, and the gap width is gradually reduced towards the upper side in the axial direction in the two radial bearing gaps Cr1, Cr2 and the region therebetween.

The rotating body 302 includes the shaft member 303 made of metal material such as stainless steel and formed to a constant diameter over the entire length in the axial direction, a hub (disk hub) 304 arranged at the outer circumference of the upper end of the shaft member 303, and a clamper for fixing a disk, a rotor magnet, and a disk not shown to the hub 304. The center of gravity (axial center of gravity) G of the rotating body 302 having such configuration is positioned on the upper side (side close to hub 304) than the center in the axial direction of the bearing member 305. The outer circumferential surface 303a of the shaft member 303 is formed to a smooth surface, and the lower end surface 303b is formed into a convex sphere shape.

The bearing member 305 includes a bottomed tubular electroformed part 306 made of deposited metal formed through the electroform processing to be hereinafter described, and a coated part 307 injection molded using molten material with the electroformed part 306 being used as an insert part.

A tapered surface 305c in which diameter thereof gradually enlarges towards the upper side in the axial direction is formed at the upper end opening of the inner circumference of the bearing member 305, and an annular seal space S3 is formed between the tapered surface 305c and the outer circumferential surface 303a of the shaft member 303.

Of the bearing member 305, a region (painted region in the figure) that constitutes the radial bearing surfaces 308, 309 of the radial bearing parts R31, R32 is arranged spaced apart at two upper and lower locations in the region of the inner circumferential surface 305a on the lower side of the tapered surface 305c. As shown in FIG. 22, a plurality of dynamic pressure grooves 308a, 309a arrayed in a herringbone shape are arranged as the dynamic pressure generating part in the radial bearing surfaces 308, 309. The upper dynamic pressure groove 308a is formed asymmetric in the axial direction with respect to the axial center m of the region between upper and lower inclined grooves, where the axial dimension X1 of the upper region of the axial center m is larger than the axial dimension X2 of the lower region. On the other hand, the lower dynamic pressure groove 309a is formed symmetric in the axial direction, where the axial dimension of the upper and lower regions is equal to the axial dimension X2. In this case, the drawing force (pumping force) of the lubricating oil by the dynamic pressure groove becomes relatively large in the upper dynamic pressure groove 308a compared to the lower symmetric dynamic pressure groove 9a during the rotation of the shaft member 303. When the pumping force is not necessary, the upper dynamic pressure groove 308a may be formed into a symmetric shape in the axial direction, similarly to the lower dynamic pressure groove 309a. The dynamic pressure groove can be arrayed into a spiral shape and other known shapes other than the herringbone shape. Note that, the dynamic pressure groove is omitted in FIG. 21 to simplify the drawing.

Partial or entire annular region of an inner bottom surface 305b of the bearing member 305 constitutes the thrust bearing surface of a thrust bearing part R3, and such region is formed to a smooth plane in the present configuration example.

The inner circumferential surface 305a of the bearing member 305 including the radial bearing surfaces 308, 309 is formed into a tapered shape in which inner diameter thereof gradually reduces towards the upper side in the axial direction. In other words, in the present configuration example, each upper end constitutes a narrow width part D1 having a small gap width and each lower end constitutes a wide width part D2 having a large gap width of the radial bearing gaps Cr1, Cr2 formed between the radial bearing surfaces 308, 309 and the outer circumferential surface 303a of the shaft member 30. In the illustrated example, the extent of slope of the inner circumferential surface 305a is drawn in an exaggerated form for easier understanding, but the ratio, that is, slope $\epsilon/L$ of the reduction amount $\epsilon$ of the radial gap between the narrow width part D1 and the wide width part D2 of the radial bearing gap Cr1 (or Cr2) and a separated distance in the axial direction between the parts (axial length of radial bearing gap) L is extremely small or $\epsilon/L \leqq 1/500$ (smaller than or equal to 0.11° in angle of slope with respect to axis line). It is difficult to mass produce the tapered surface of such small angle of slope at low cost through general machine processing, but such tapered surface can be mass produced at low cost and at high accuracy through the electroform processing due to the following reasons.

The manufacturing process of the bearing member 305 having the above-mentioned configuration is described based on the drawings.

The bearing member 305 is manufactured through a process of forming a master that constitutes a molding parent body of the electroformed part 306 (Z1), a process of masking one part of the surface of the master with an insulative material (Z2), a process of depositing and forming the electroformed part 306 by performing electroform processing on the master performed with masking (Z3), a process of inserting the master arranged with the electroformed part 306 and injection molding the bearing member 305 (Z4), and a process of separating the master and the bearing member 305 including the electroformed part 306 (Z5) in order.

(Z1) Master Forming Process

In the master forming process shown in FIG. 23(A), a solid shaft shaped master 311 made of conductive material such as stainless steel, nickel-chromium steel, other nickel alloy, or chromium alloy which are subjected to hardening process is formed. The master 311 can be made of non-metal material such as ceramic performed with conductive processing (e.g., forming conductive coating on the surface) other than such metal materials.

A forming part N for molding the electroformed part 306 is arranged at one end surface of the master 311 and a partial region of the outer circumferential surface continuing thereto. The forming part N has a shape in which concave-convex pattern on the inner side of the electroformed part 306 is inverted, where a column of mold parts 311a1, 311a2 for molding a hill part between the dynamic pressure grooves 308a, 309a is formed in the circumferential direction at two locations spaced apart in the axial direction at the outer circumferential surface. Of course, the shape of the mold parts 311a1, 311a2 may be formed into a spiral shape and the like in correspondence to the shape of the dynamic pressure groove. The surface accuracy of the forming part N including the mold parts 311a1, 311a2 directly influences the accuracy of the electroformed part 306. Therefore, the molding part N is desirably finished to accuracy as high as possible according to various accuracies demanded for the electroformed part 306.

(Z2) Masking Process

In the masking process, as shown in FIG. 23(B), masking is performed on the outer surface of the master 311 excluding the forming part N, and a masking part 312 is formed. In view of electroform processing to be hereinafter described, material having insulation and corrosion resistance with respect to electrolyte solution is suitably used for the coating material for forming the masking part 312.

(Z3) Electroform Processing Process

The electroform processing is carried out by immersing the master 311 in the electrolyte solution containing metal ion such as Ni and Cu, and thereafter, flowing current to the master 311 to deposit (electrolytic deposition) the target metal on the forming part N of the master 311. The electrolyte solution may contain a slidably moving material such as carbon and fluorinated particle, or stress alleviating material such as saccharine, as necessary. The type of electrodepositing metal is appropriately selected according to physical nature and the chemical nature such as hardness and fatigue strength desired for the bearing surface.

After electroform processing is terminated, as shown in FIG. 23(C), an electroformed member 313 having the electroformed part 306 attached to the forming part N of the master 311 is formed. The shape of the mold parts 311a1, 311a2 is transferred to the inner circumferential surface of the electroformed part 306 at this point, and a plurality of dynamic pressure grooves 308a, 309a shown in FIG. 22 are formed spaced apart in the axial direction. The thickness of the electroformed part 306 is a suitable thickness such as a thickness of about 10 μm to 200 μm according to the required bearing performance and bearing size, and Further, application etc., since the stripping property from the master 311 lowers if the thickness is too thick, and durability of the electroformed part 306 lowers if the thickness is too thin.

The electroformed part 306 may be formed through a method complying with an electroless plating (chemical plating) in addition to the method complying with the electrolytic plating (electrical plating). If the method complying with the electroless plating is adopted, the conductivity of the master 311 and the insulating property of the masking part 312 become unnecessary, but the masking part 312 is desirably formed with material having corrosion resistance.

(Z4) Insert Molding Process

Although not shown, in the insert molding process, the electroformed member 313 is arranged in a predetermined die as the insert component, and thereafter, insert molding is performed using molten material such as molten resin. After injecting resin, curing resin and opening the die, a molded article in which the electroformed member 313 including the master 311 and the electroformed part 306, and the coated part 307 are integrated is obtained, as shown in FIG. 24.

If the coated part 307 is made of resin, crystalline resin or amorphous resin can be used for the base resin. Liquid crystal polymer (LCP), polyphenylene sulfide (PPS), polyether ether ketone (PEEK), polyacetal (POM), polyamide (PA), and the like are used as crystalline resin, and polyphenylsulfone (PPSU), polyethersulfone (PES), polyetherimide (PEI), polyamideimide (PAI), and the like are used as amorphous resin. One type or two or more types of various fillers such as reinforcing material (any form including fiber form, powder form, and the like), lubricating agent, conductive material and the like can be added to such base resin as necessary.

Molten material other than resin such as low melting point metal including magnesium alloy and aluminum alloy can be used for the coated part 307. In addition, a so-called MIM molding for injection molding a mixture of metal powder and binder and then degreasing and sintering can be adopted, and Further, a so-called CIM molding using a mixture of ceramic and binder can be used.

According to the characteristics of the electroform processing, the deposition starting surface on the master 311, that is, the inner surface of the electroformed part 306 constitutes a tight surface on which the surface accuracy of the master 311 (forming part N) is transferred at high accuracy whereas the surface on the deposition terminating side, that is, the outer surface of the electroformed part 306 is formed to a rough surface. Thus, when molding the coated part 307, the molten resin enters the microscopic concave-convex parts on the surface of the electroformed part 306, and hence the bonding force of the electroformed part 306 and the coated part 307 becomes strong by a so-called anchor effect.

(Z5) Separating Process

The electroformed member 313 formed as above is transferred to the separating process, and are separated into the bearing member 305 in which the electroformed part 306 and the coated part 307 are integrated, and the master 311. In the separating process, the diameter of the inner circumferential surface of the electroformed part 306 is increased by a slight amount by applying impact to the master 311 or the bearing member 305, for example, and hence the electroformed part 306 can be stripped from the surface of the master 311. The master 311 then can be separated from the bearing member 305, and the bearing member 305 serving as a completed product is obtained by removing the master 311. As a means of stripping the electroformed part 306, a method of heating (or cooling) the electroformed part 306 and the master 311 and creating difference in the thermal expansion amount therebetween, or a method of simultaneously using both means (impact and heating) and the like can be used in addition to the above-mentioned method.

The bearing member 305 is formed into a bottomed tubular shape and has the inner circumferential surface 305a formed into a tapered shape which diameter gradually reduces towards the opening side, and hence the separation of the master 311 from the bearing member 305 becomes a so-called forced removal. However, if the master 311 is forcibly removed when the dynamic pressure grooves 308a, 309a are formed on the inner circumferential surface 305a of the bearing member 305 as in the present configuration example, in particular, the dynamic pressure grooves 308a, 309a may be damaged and the bearing performance may lower. In the present configuration example, on the other hand, the extent of forced removal is small since the slope $\epsilon/L$ of the inner circumferential surface 305a including the radial bearing surfaces 308, 309 of the bearing member 305 is set to a minute value of about $\epsilon/L \leq 1/500$. Further, since the electroformed part 306 constituting the bearing member 305 is formed to an extremely thin thickness and the electroformed part 306 and the coated part 307 are strongly attached, the electroformed part 306 deforms following the deformation of the resin coated part 307 having excellent elasticity when removing the master 311. Therefore, the damage of the dynamic pressure grooves 308a, 309a by the separation of the master 311 can be effectively prevented.

A shaft member 303 (rotating body 302) prepared separately from the removed master 311 is inserted to the inner circumference of the bearing member 305 formed as above, and the lubricating oil serving as fluid is filled in the internal space of the bearing member 305, and hence the fluid dynamic bearing device 301 shown in FIG. 21 is completed. The separated master 311 can be repeatedly used in electroform processing, and hence high precision bearing member 305 can be mass produced stably and at low cost. The drawing force by the capillary force acts on the lubricating oil in the seal space S3 in the lubricating oil fully-filled state. The lubricating oil is constantly maintained within a range of the seal gap S3.

In the fluid dynamic bearing device 301 of the above-mentioned configuration, when the shaft member 303 (rotating body 302) rotates, the radial bearing surfaces 308, 309 formed spaced apart at two upper and lower locations of the inner circumferential surface 305a of the bearing member 305 respectively face the outer circumferential surface 303a of the shaft member 303 by way of radial bearing gaps Cr1, Cr2. With the rotation of the shaft member 303, the dynamic pressure of the lubricating oil generates in the radial bearing gaps Cr1, Cr2, the oil film rigidity of the lubricating oil film formed in the radial bearing gaps Cr1, Cr2 by such pressure enhances, and the shaft member 303 is non-contact supported in a freely rotating manner in the radial direction. The first radial bearing part R31 and the second radial bearing part R32 for non-contact supporting the rotating body 302 including the shaft member 303 in a freely rotating manner in the radial direction are formed. At the same time, a thrust bearing part T3 for supporting the rotating body 302 including the shaft member 303 in a freely rotating manner in the thrust direction is formed between the lower end surface 303b of the shaft bearing 303 and the inner bottom surface 305b of the bearing member 305.

Generally, the rigidity (bearing rigidity) of the oil film formed in the radial bearing gap increases as the gap width thereof becomes smaller. In the above-mentioned configuration in which the gap width of the radial bearing gap is gradually decreased towards the upper side in the axial direction, the oil film rigidity in the narrow width part D1 having a small gap width becomes higher than the oil film rigidity in the wide width part D2 having a large gap width in the radial bearing gap. In the present configuration example, the center of gravity G of the rotating body 302 is positioned on the upper side of the axial center of the bearing member 305, and hence the bearing rigidity can be enhanced in a region close to the center of gravity G of the rotating body 302, whereas the bearing rigidity can be lowered in a region distant from the center of gravity G. As a result, the ensuring of bearing rigidity and the lowering of torque required for the rotating body 302 including the shaft member 303 to rotate at satisfactory precision can be simultaneously achieved. Further, since the radial bearing gaps are arranged at two locations spaced apart in the axial direction in the present configuration example, the bearing center of the radial bearing parts R31, R32 is positioned on the upper side of the axial center of the bearing member 305. Therefore, the separated distance of the bearing center of the radial bearing part and the center of gravity G of the rotating body 302 can be reduced, and a structure excelling in load performance (moment rigidity) with respect to the moment load is obtained.

The ratio (slope) $\epsilon/L$ of the amount of reduction $\epsilon$ of the radial gap between the narrow width part D1 and the wide width part D2 of the radial bearing gap Cr1 (or Cr2) and the separated distance in the axial direction between the parts (axial length of radial bearing gap) L is desirably $1/1000 \leq \epsilon/L \leq 1/500$. If the value of $\epsilon/L$ is smaller than 1/1000, it becomes difficult to sufficiently obtain the effect of enhancing the bearing rigidity and the effect of reducing the torque. If the value of $\epsilon/L$ is greater than 1/500, the value of the wide width part D2 becomes too large, and the bearing rigidity may lack and the rotational accuracy may degrade. In molding the above-mentioned bearing member 305, the extent of forced removal becomes large, and the radial bearing surfaces 308, 309 may be damaged.

Regarding the minimum diameter gap (inner diameter dimension in narrow width part D1) $\delta$ of the radial bearing gap Cr1, each member is desirably formed such that the ratio $\delta/d$ with respect to the shaft diameter d of the shaft member 303 is $1/1000 \leq \delta/d \leq 1/250$ for the following reasons. First, the lower limit value 1/1000 of the ratio $\delta/d$ may be obtained from the circularity and the cylindricality etc. of the outer circumferential surface of the master 311 and the shaft member 303, and the inner circumferential surface of the electroformed member 306. That is, if the diameter gap $\delta$ is smaller than the circularity and the cylindricality of the outer circumferential surface 303a of the shaft member 303 or the inner circumferential surface 305a of the bearing member 305, the shaft member 303 and the bearing member 305 contact, and a predetermined performance becomes difficult to ensure. Various precisions may be further enhanced, but increase in cost is inevitable as the precision becomes higher. Therefore, in view of the balance between the function aspect and the cost aspect, the ratio δ/d is desirably greater than or equal to 1/1000. The upper limit value 1/250 of the ratio δ/d can be obtained from the standpoint of rotational accuracy and the moment rigidity. That is, the desired bearing rigidity and the moment rigidity cannot be ensured if the minimum diameter gap δ of the radial bearing gap becomes large, and hence drawbacks such as degradation of the rotational accuracy and contact of the shaft member 303 and the bearing member 305 occur. Therefore, the ratio δ/d is desirably smaller than or equal to 1/250.

In the present configuration example, a region that constitutes the radial bearing surfaces 308, 309 of the inner circumferential surface 305a of the bearing member 305, and an inner bottom surface 305b (thrust bearing surface) that slidably contacts the lower end surface 303b of the shaft member 303 are formed on the electroformed part 306 made of deposited metal. In terms of the characteristics of the electroform processing, the inner surface precision that constitutes the deposition starting surface to the master 311 of the electroformed part 306 is formed to a tight surface transferred with the surface shape of the master 311 at high accuracy. Therefore, if the forming part N for forming the electroformed part 306 is formed at high accuracy out of the outer surface of the master 311, in particular, the accuracy of the inner circumferential surface 305a and the inner bottom surface 305b of the bearing member 305 including the dynamic pressure grooves 308a, 309a can be easily enhanced without performing the special finishing process etc., and the width precision of the radial bearing gaps Cr1, Cr2 can be managed at high accuracy. Since the radial bearing surfaces 308, 309 and the thrust bearing surface are metal surfaces, change in characteristics due to change in temperature, wear and the like can be suppressed in the radial bearing parts R31, R32, and abrasion resistance can be enhanced in the thrust bearing part T3. Therefore, increase in the shift amount of the rotating body 302 when vibration or impact is applied to the fluid dynamic bearing device 301, and lowering in rotational performance involved in resonance are suppressed, and high rotational performance can be maintained.

One configuration example of the fluid dynamic bearing device according to the fourth embodiment of the present invention has been described above, but the configuration of the present invention described above is not limited to the fluid dynamic bearing device 301 of the above-mentioned mode, and can be preferably used to the fluid dynamic bearing device of other modes. The configuration example thereof is described below based on the drawings, but the members and the parts complying with the above-mentioned mode are denoted by the same reference symbols, and redundant description thereof is omitted.

FIG. 25 shows a second configuration example of a fluid dynamic bearing device according to the fourth embodiment of the present invention. The fluid dynamic bearing device 321 shown in the figure differs from the fluid dynamic bearing device 301 shown in FIG. 21 mainly in that the hub 304 constituting the rotating body 302 is arranged on the lower side of the bearing member 305 and the center of gravity G of the rotating body 302 is positioned at the lower side of the bearing member 305, and in correspondence thereto, in that the inner diameter dimension of the bearing member 305 gradually decreases towards the lower side in the axial direction. Although not shown, a seal space may be formed in the opening at both ends of the bearing member 305, similarly to the mode shown in FIG. 21.

FIG. 26 shows a third configuration example of the fluid dynamic bearing device according to the fourth embodiment of the present invention. In the fluid dynamic bearing device 331 shown in the figure, the inner circumferential surface of the bearing member 305 is partitioned to a first inner circumferential surface 305d of relatively small diameter in the axial direction and a second inner circumferential surface 305e of lager diameter than the first inner circumferential surface 305d, instead of a tapered shape in which the inner diameter dimension gradually decreases to either one side in the axial direction as shown in FIG. 21 and FIG. 25. The radial bearing surface 308 is arranged in a partial or the entire axial region of the first inner circumferential surface 305d, and the radial bearing surface 309 is arranged in a partial or the entire axial region of the second inner circumferential surface 305e. That is, in the configuration example, the entire radial bearing gap Cr1 formed between the upper radial bearing surface 308 and the outer circumferential surface 303a of the shaft member 303 constitutes the narrow width part D1, and the entire radial bearing gap Cr2 formed between the lower radial bearing surface 309 and the outer circumferential surface 303a of the shaft member 303 constitutes the wide width part D2.

FIG. 27 shows a fourth configuration example of the fluid dynamic bearing device according to the fourth embodiment of the present invention. The fluid dynamic bearing device 341 shown in the figure differs in configuration with the fluid dynamic bearing device 301 shown in FIG. 21 mainly in that the bearing member 345 is partitioned to a body part 345a including the radial bearing surfaces 308, 309, and a substantially spherical projecting part 345b arranged so as to project towards the upper side of the body part 345a and forming a seal space S3 and a lubricating oil pool 346 with the outer circumferential surface 303a of the shaft member 303. The side part constituting the body part 345a entirely has the inner diameter dimension gradually decreasing towards the upper side in the axial direction.

Although not shown, the bearing member 345 can be formed as below. According to the molding procedure of the bearing member 305 described above, the side part of the body part 345a and the projecting part 345b are molded while being parallel to the axis line, and separated from the master. The pressure is applied from the outer diameter side of the bearing member 345 while heating the die modeled to the shape of the body part 345a and the projecting part 345b as the completed product, and hence the side part of the body part 345a and the projecting part 345b are deformed towards the inner diameter direction to be in one type of plastic deformed state. The die is then opened, and the bearing member 345 shown in the figure is obtained.

In the above, a configuration has been described in which the shaft member 303 is formed at a constant diameter over the entire length in the axial direction and the inner diameter dimension of the bearing member 305 is differed in the axial direction so that the gap width of the radial bearing gap is differed in the axial direction. However, the gap width of the radial bearing gap can be differed in the axial direction in any of the configuration examples described above by forming the inner circumferential surface 305a of the bearing member 305 at a constant diameter over the entire length in the axial direction and differing the diameter of the shaft member 303 in the axial direction.

A configuration of generating the fluid dynamic pressure by the dynamic pressure groove of herringbone shape or spiral shape has been illustrated as the radial bearing parts R31, R32, but the present invention is not limited thereto. One or both radial bearing parts R31, R32 may be formed with a so-called multi-circular arc bearing or step bearing. Such bearings can be obtained by forming a plurality of circular arc surfaces or axial grooves serving as dynamic pressure parts in the radial bearing surfaces 308, 309 of the bearing member 305. The method of forming such dynamic pressure generating part complies with each process of forming the dynamic pressure groove 308a, 309a, and hence detailed description is omitted.

FIG. 28 shows one example of when forming one or both radial bearing parts R31, R32 with multi-circular arc bearing. In this example, a region that constitutes the radial bearing surface 308, 309 of the inner circumferential surface of the bearing member 305 is formed with three circular arc surfaces 351 (i.e., three-circular arc bearing). The center of curvature of the three circular arc surfaces 351 is offset at an equal distance from the center of axis O of the bearing member 305 (shaft member 303). In each region partitioned by the three circular arc surfaces 351, the radial bearing gap is a wedge shaped gap Cr3 gradually narrowing to a wedge shape with respect to both directions in the circumferential direction. Thus, when the bearing member 305 and the shaft member 303 relatively rotate, the lubricating oil in the radial bearing gap is pushed to the minimum gap side of the wedge shaped gap Cr3 according to the direction of the relative rotation, and the pressure thereof rises. The bearing member 305 and the shaft member 303 are non-contact supported by the dynamic pressure action of the lubricating oil. An axial groove of one step deeper called a separation groove may be formed at a boundary of the three circular arc surfaces 351.

FIG. 29 shows another example of when forming one or both radial bearing parts R31, R32 with multi-circular arc bearing. In this example as well, a region that constitutes a radial bearing surface 308, 309 of the inner circumferential surface of the bearing member 305 is constructed of three circular arc surfaces 351 (so-called three-circular arc bearing), where the radial bearing gap is a wedge shaped gap Cr3 gradually narrowing to a wedge shape with respect to one direction in the circumferential direction in each region partitioned with three circular arc surfaces 351. The multi-circular arc bearing of such configuration may be referred to as taper bearing. An axial groove of one step deeper called a separation groove 352 is formed at the boundary of the three circular arc surfaces 35. Thus, when the bearing member 305 and the shaft member 303 relatively rotate in a predetermined direction, the lubricating oil in the radial bearing gap is pushed to the minimum gap side of the wedge shaped gap Cr3, and the pressure thereof rises. The bearing member 305 and the shaft member 303 are non-contact supported by the dynamic pressure action of the lubricating oil.

FIG. 30 shows another example of when forming one or both radial bearing parts R31, R32 with multi-circular arc bearing. In this example, a predetermined region θ on the minimum gap side of the three circular arc surfaces 351 is formed with a concentric circular arc surface having the center of axis O of the bearing member 305 (shaft member 303) as the center of curvature in the configuration shown in FIG. 29. Therefore, the radial bearing gap (minimum gap) is constant in each predetermined region θ. The multi-circular arc bearing of such configuration is sometimes referred to as taper-flat bearing.

FIG. 31 shows one example of when forming one or both radial bearing part R31, R32 with step bearing. In this example, a plurality of axial groove shaped dynamic pressure grooves 353 are arranged at a predetermined interval in the circumferential direction in a region that constitutes the radial bearing surfaces 308, 309 of the inner circumferential surface of the bearing member 305 (electroformed part 306).

The radial bearing part is arranged spaced apart at two locations in the axial direction as in the radial bearing parts R31, R32, but the radial bearing part may be arranged at three or more locations over the upper and lower region of the inner circumferential surface of the bearing member 305. The multi-circular arc bearing shown in FIG. 28 to FIG. 30 is a so-called three-circular arc bearing, but is not limited thereto, and may be a so-called four-circular arc bearing, a five-circular arc bearing, or a multi-circular arc bearing constructed of a circular arc surface of the number of six or more circular arcs.

A case where the dynamic pressure generating part is formed in the radial bearing surfaces 308, 309 of the electroformed part 306 constituting the bearing member 305 has been described above, but the dynamic pressure generating part may be formed at the outer circumferential surface 303a of the shat member 303 facing the radial bearing surfaces 308, 309. In this case, the region that constitutes the radial bearing surface 308, 309 of the electroformed part 306 is formed into a cylindrical surface free from concavity of convexity.

A case has been described where the dynamic pressure generating part is formed at the radial bearing surfaces 308, 309 of the electroformed part 306 constituting the bearing member 305 or the outer circumferential surface 303a of the shaft member 303, and the fluid dynamic pressure is generated in the radial bearing gap at the dynamic pressure generating part to constitute the radial bearing parts R31, R32 with dynamic pressure bearing. However, the radial bearing parts R31, R32 may be formed with a cylindrical bearing by forming the radial bearing surfaces 308, 309 of the electroformed part 306 to a cylindrical surface free from concavity and convexity and by forming the outer circumferential surface 303a of the shaft member 303 to a perfect circle in cross-section without concavity and convexity (not shown).

A mode of constituting the thrust bearing part T3 with a pivot bearing has been described above, but the thrust bearing part may be formed with a dynamic pressure bearing by forming the lower end of the shaft member 303 to be a flat surface, and arranging a plurality of dynamic pressure grooves etc. arrayed in a spiral shape or a herringbone shape at the flat surface or an end surface of the bearing member facing thereto (not shown).

The lubricating oil is used as the lubricating fluid to be filled in the internal space of the fluid dynamic bearing device, but other fluids capable of forming a fluid film, such as lubricating grease and magnetic fluid, and Further, gas etc. including air can be used.

The fluid dynamic bearing device described above has high rotational accuracy, and hence can be suitably used as a bearing for various motors where high rotational performance is demanded such as spindle motor of the disk device such as HDD, and a fan motor of a personal computer.

BRIEF DESCRIPTION OF THE DRAWINGS

FIG. 16 is an end surface view of the bearing member shown in FIG. 15 seen from a direction of an arrow a.

Figure 1:
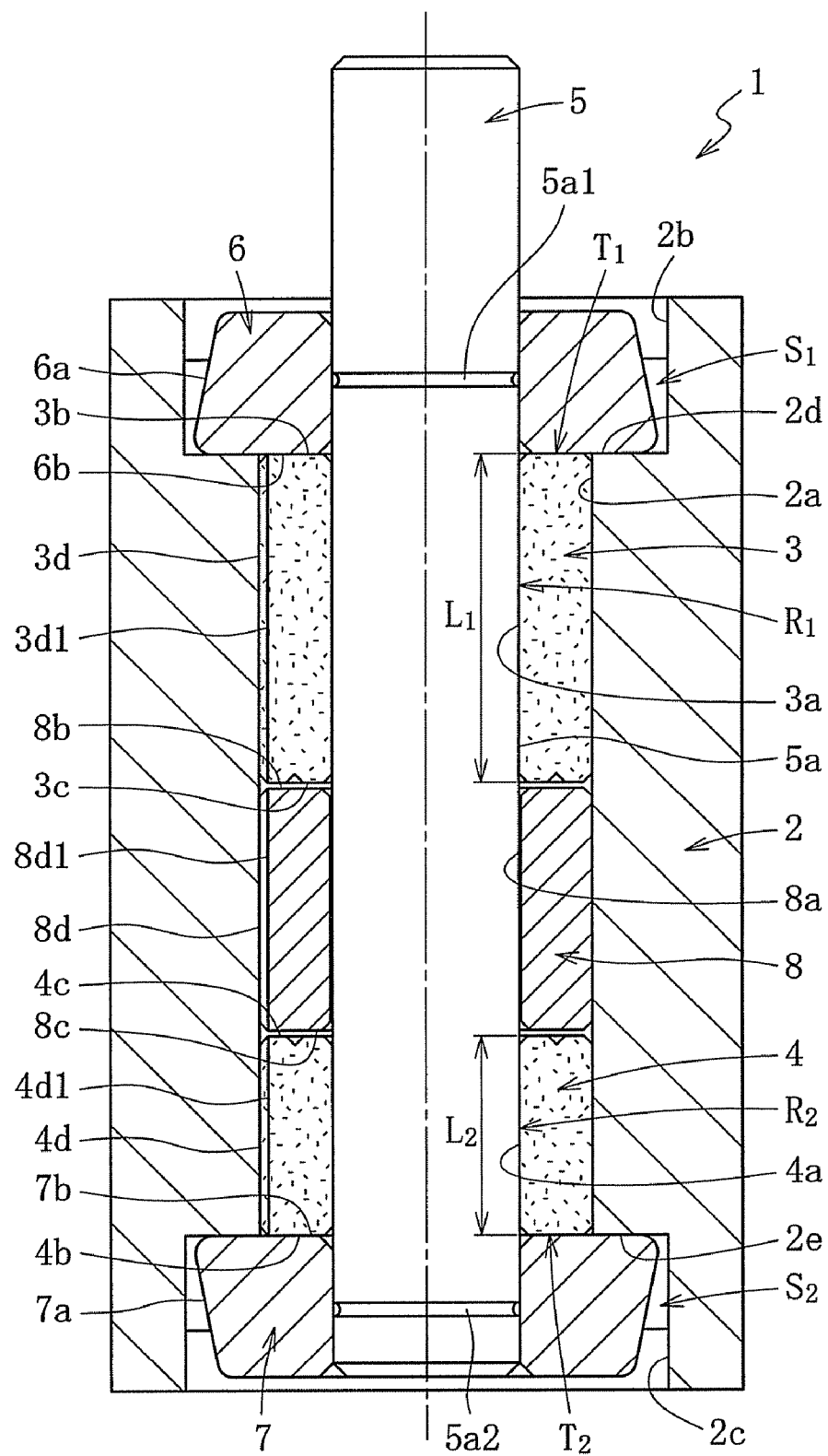
FIG. 1 is a cross-sectional view showing a first configuration example of a fluid dynamic bearing device according to a first embodiment of the present invention.
Figure 2:
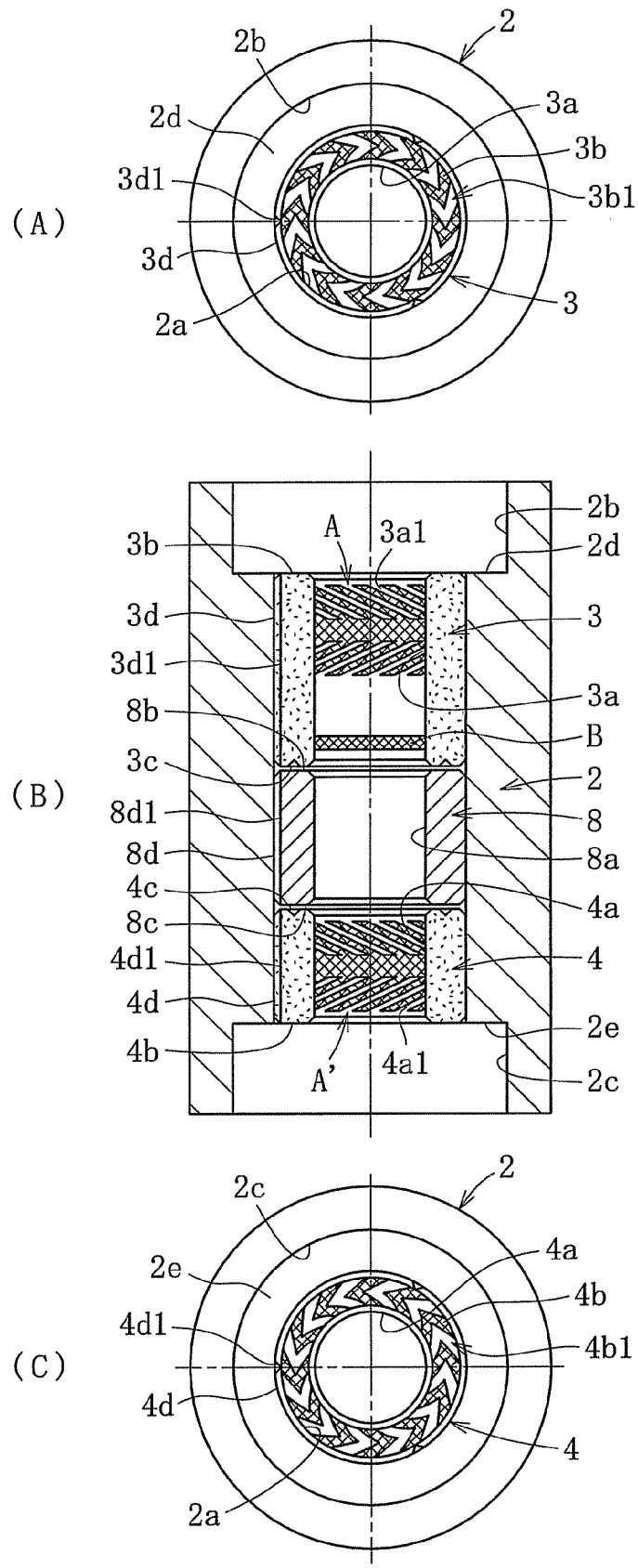
FIG. 2(A) is a top view.
FIG. 2(B) is a cross-sectional view.
FIG. 2(C) is a bottom view showing a state in which a bearing sleeve is fixed to a housing.
Figure 3:
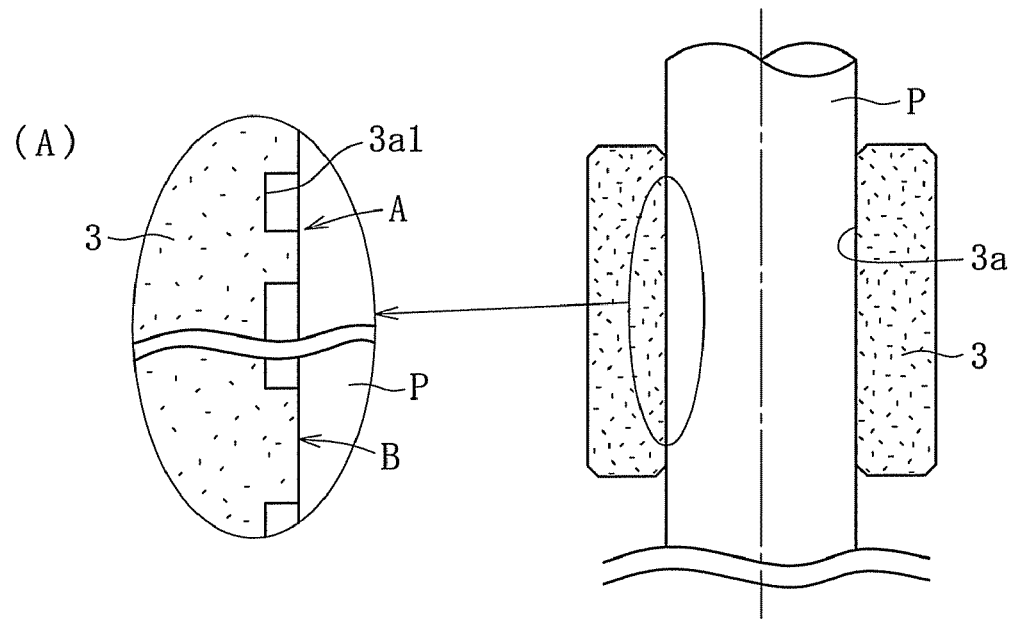
FIG. 3(A) is a schematic view showing an assembling process of the bearing sleeve.
FIG. 3(B) is an enlarged cross-sectional view showing an upper portion of the housing.
Figure 3:
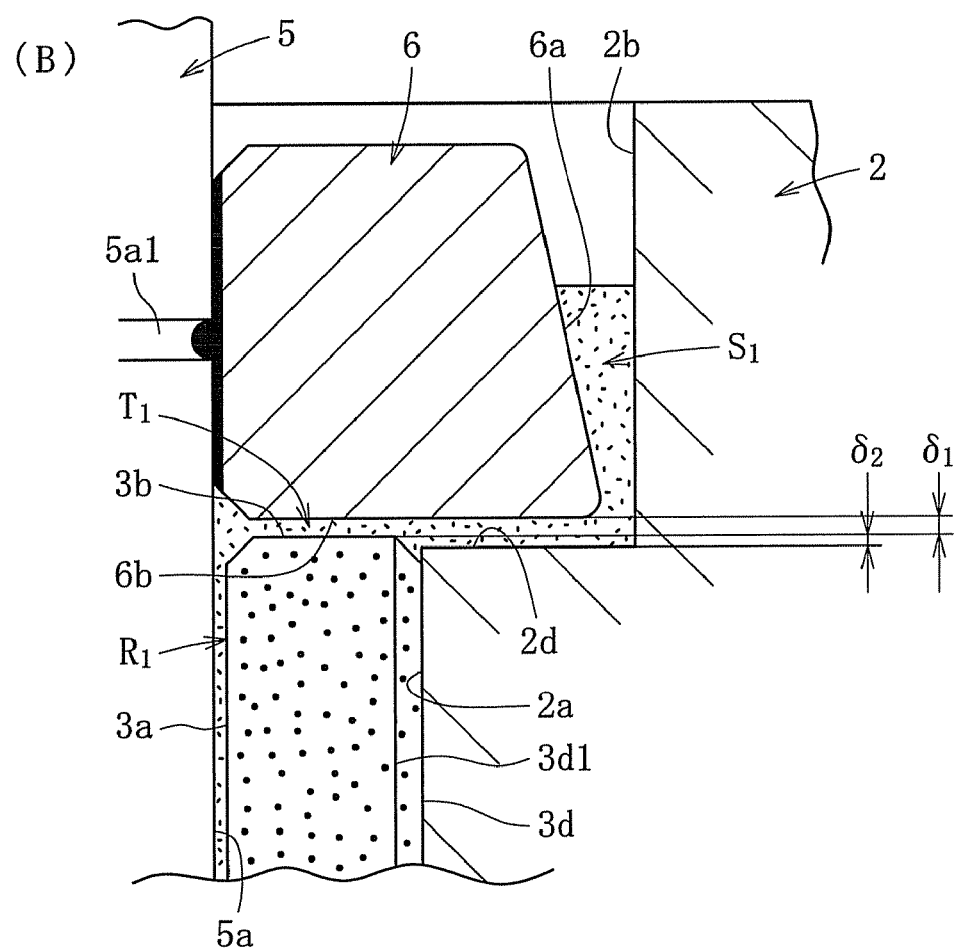
Figure 4:
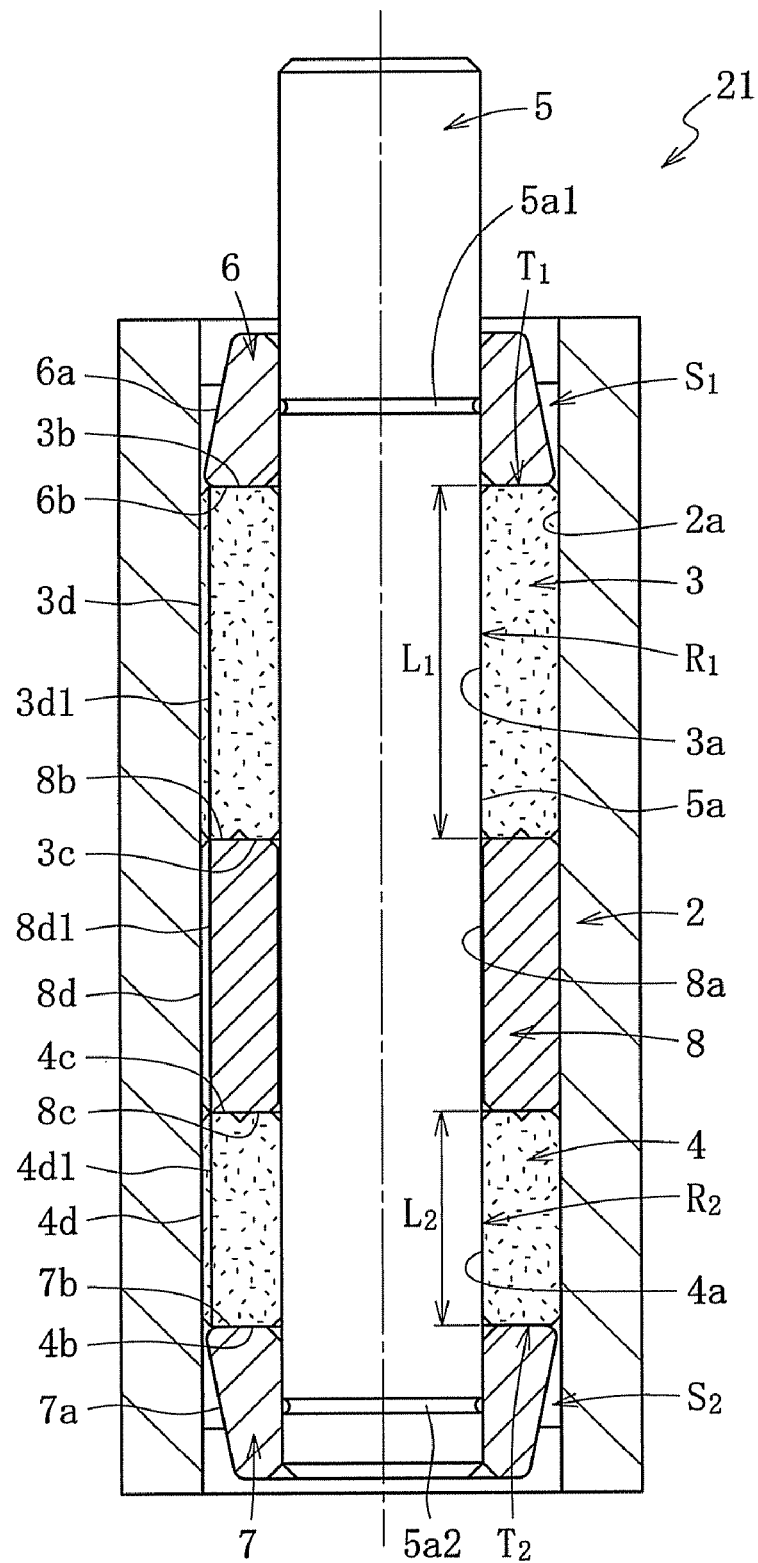
FIG. 4 is a cross-sectional view showing a second configuration example of the fluid dynamic bearing device according to the first embodiment.
Figure 5:
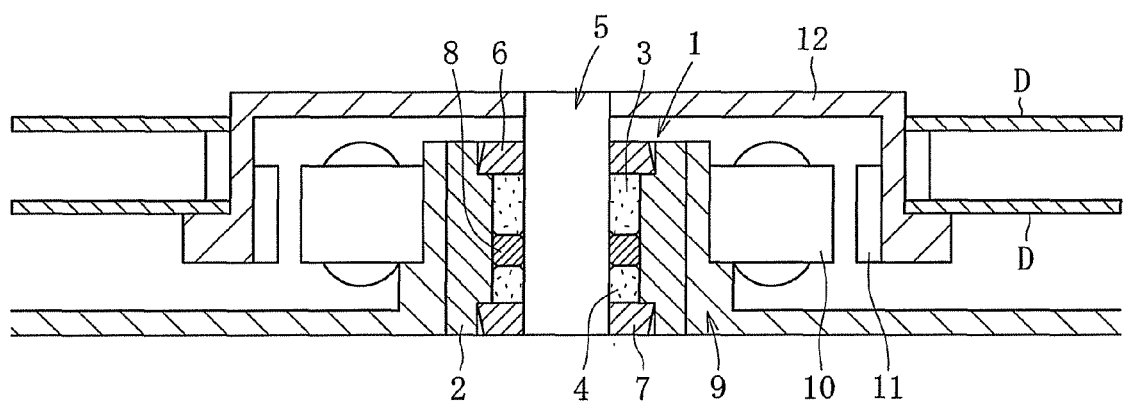
FIG. 5 is a cross-sectional view schematically showing a spindle motor incorporating the fluid dynamic bearing device.
Figure 6:
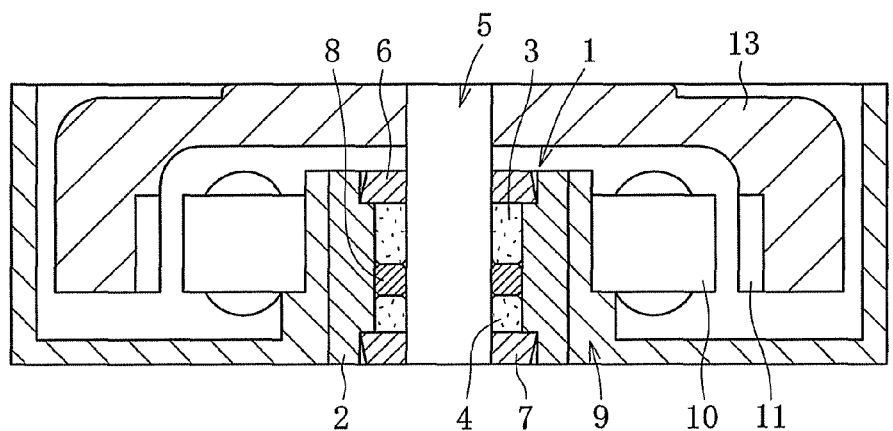
FIG. 6 is a cross-sectional view conceptually showing a fan motor incorporating the fluid dynamic bearing device.
Figure 7:
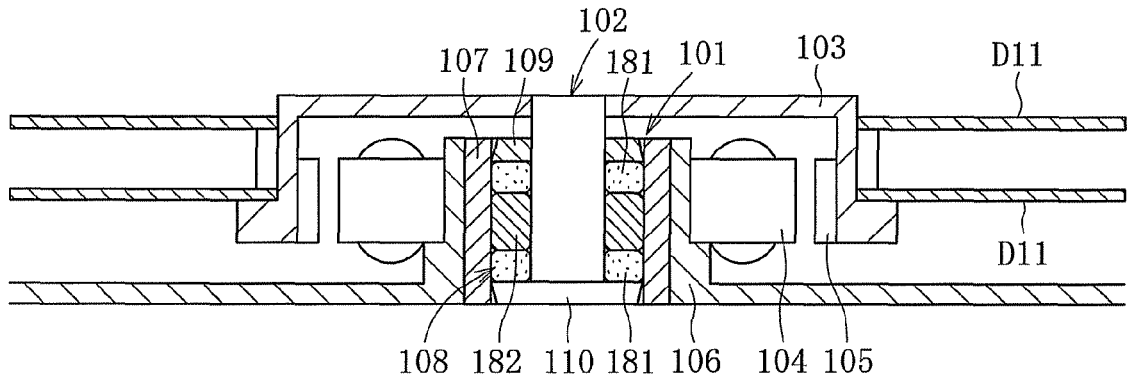
FIG. 7 is a cross-sectional view conceptually showing a spindle motor incorporating the fluid dynamic bearing device.
Figure 8:
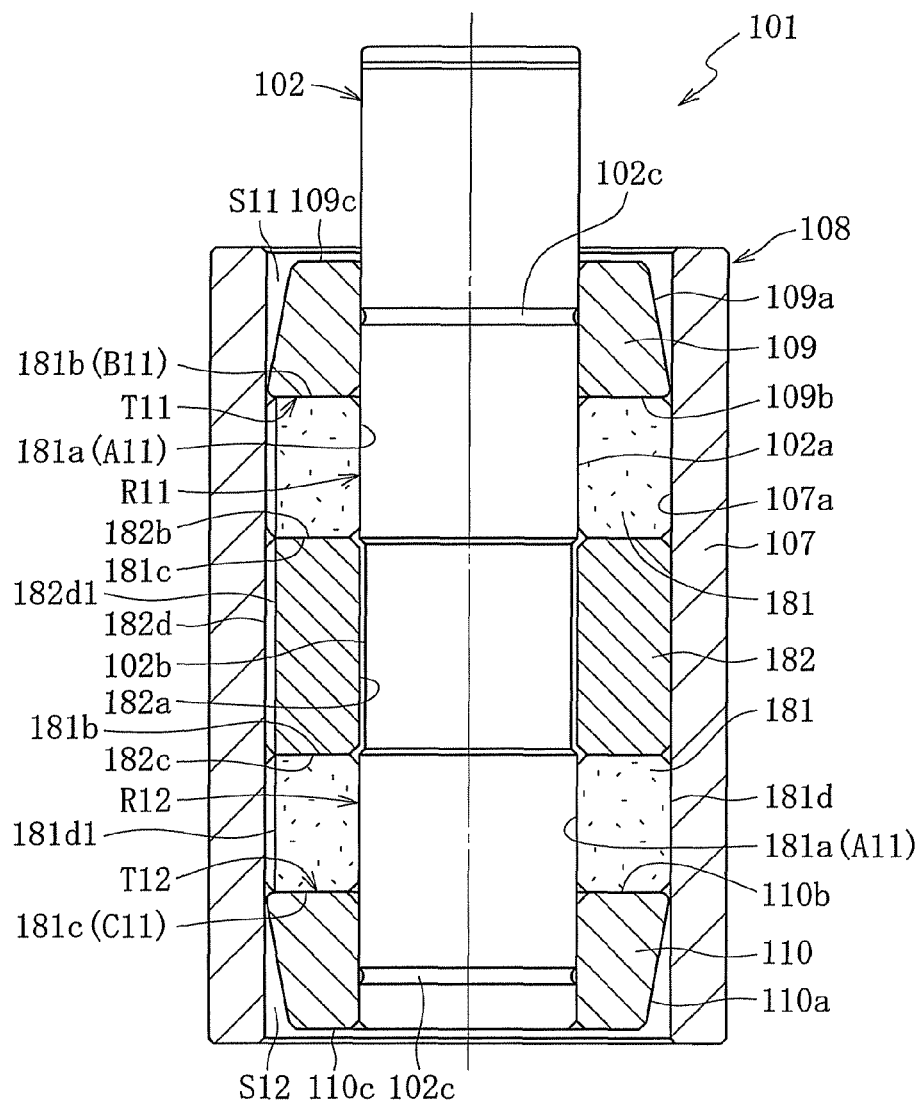
FIG. 8 is a cross-sectional view showing a first configuration example of a fluid dynamic bearing device according to a second embodiment of the present invention.
Figure 9:
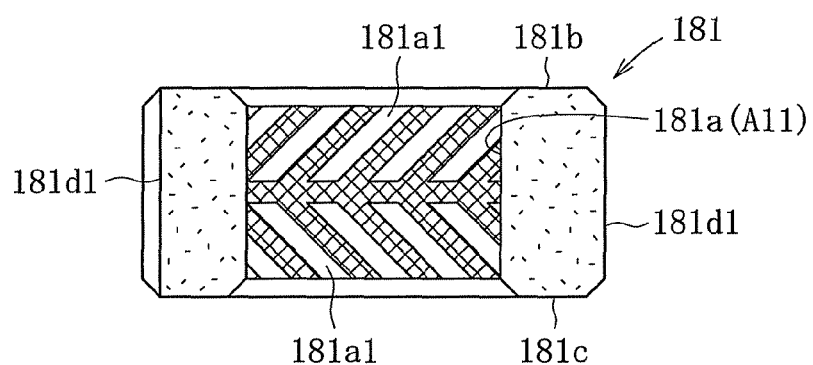
FIG. 9(A) is a longitudinal cross-sectional view of a bearing sleeve.
FIG. 9(B) is a view showing an upper end surface of the bearing sleeve.
FIG. 9(C) is a view showing a lower end surface of the bearing sleeve.
Figure 9:
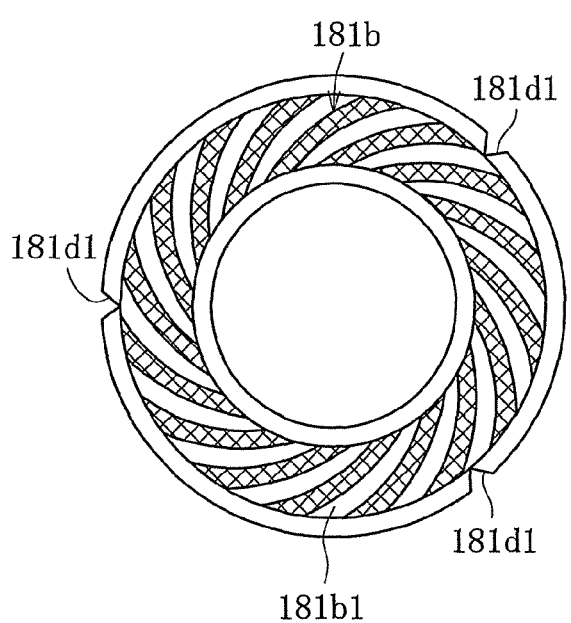
Figure 9:
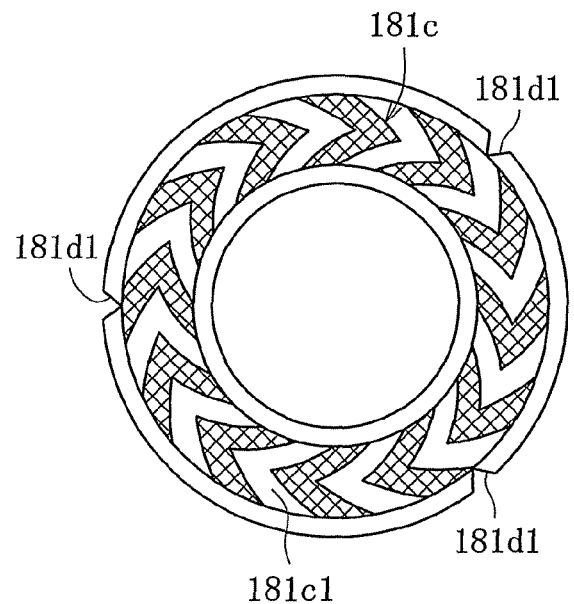
Figure 10:
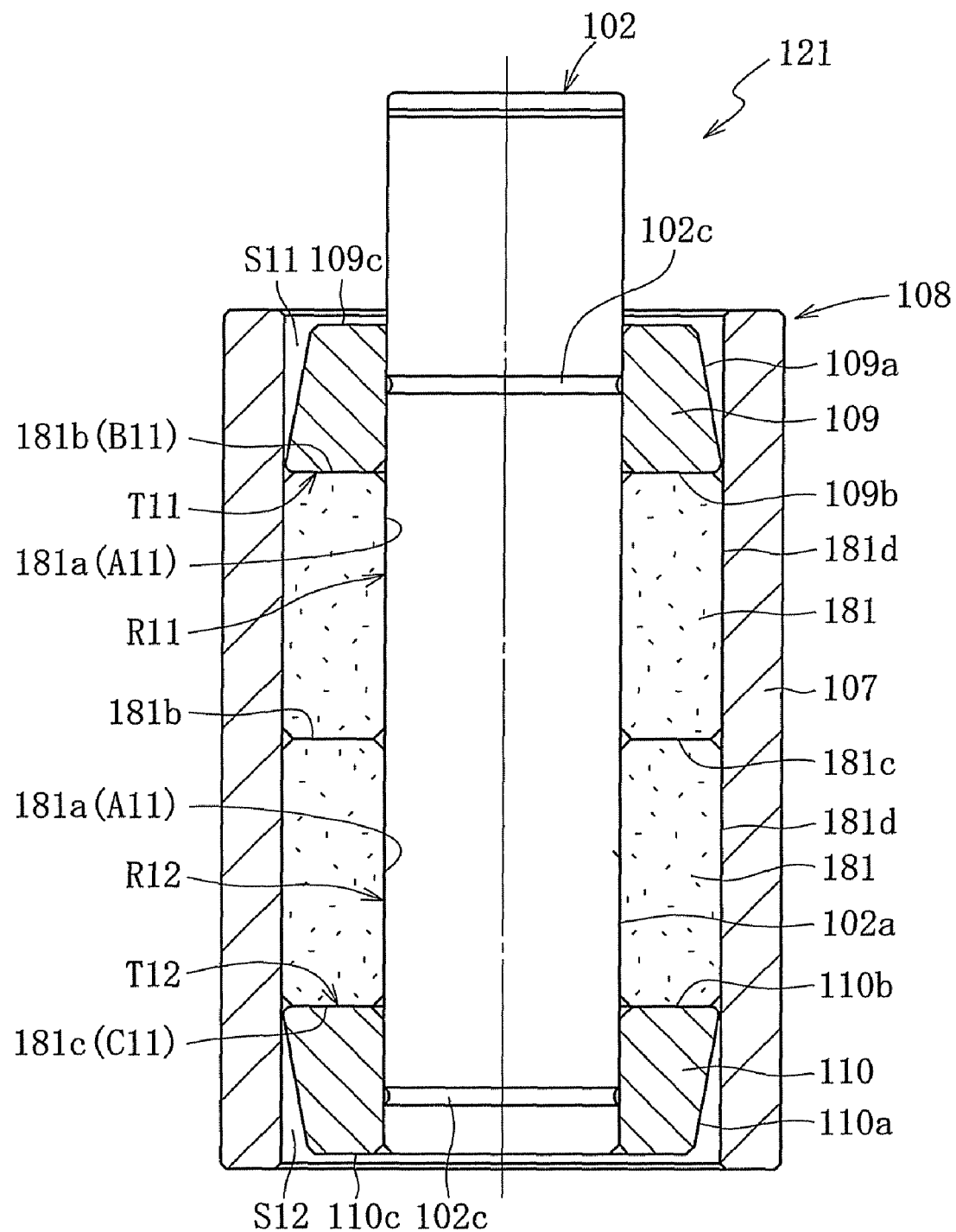
FIG. 10 is a cross-sectional view showing a second configuration example of the fluid dynamic bearing device according to the second embodiment.
Figure 11:
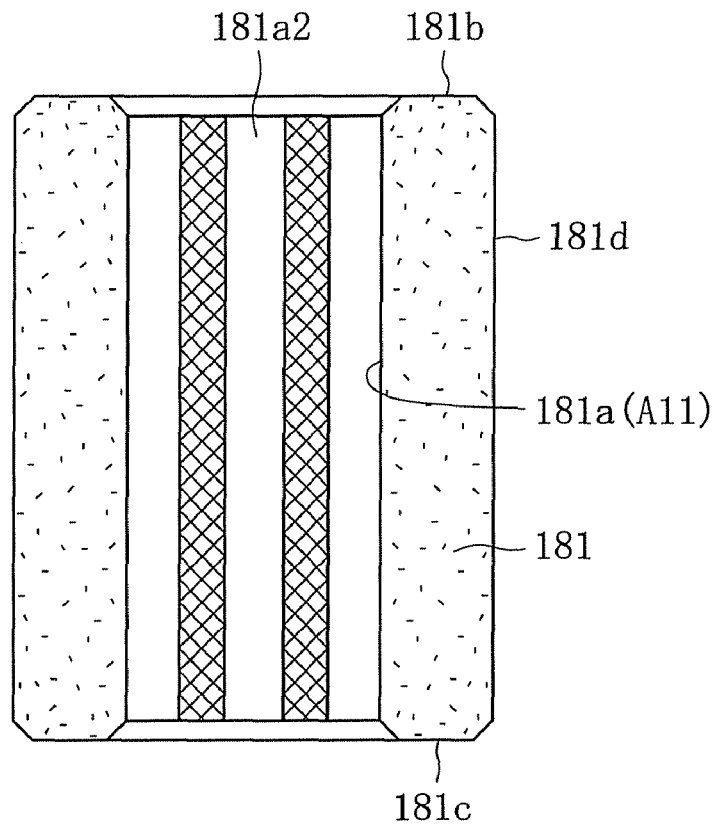
FIG. 11 is a longitudinal cross-sectional view showing another configuration example of the bearing sleeve.
Figure 12:
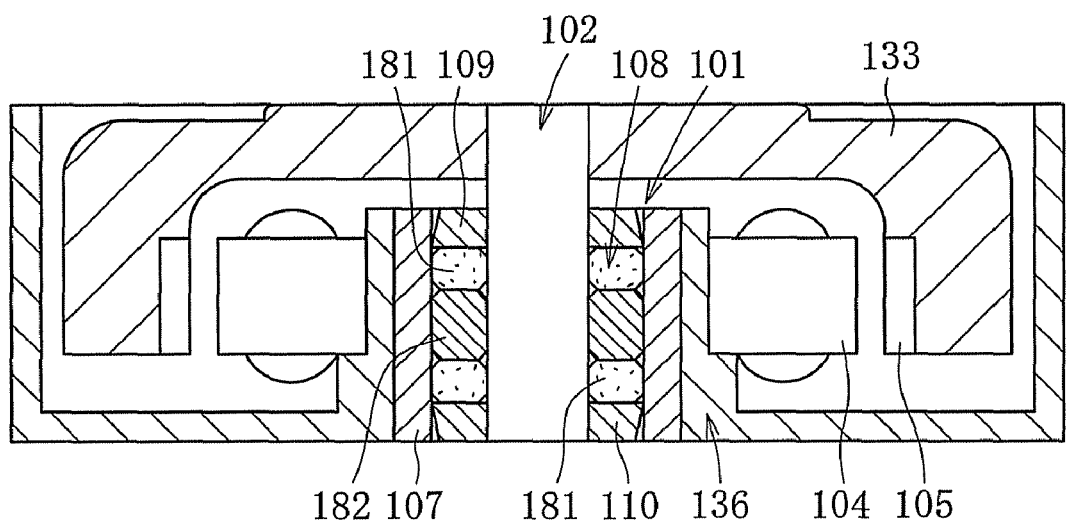
FIG. 12 is a cross-sectional view conceptually showing a fan motor incorporating the fluid dynamic bearing device.
Figure 13:
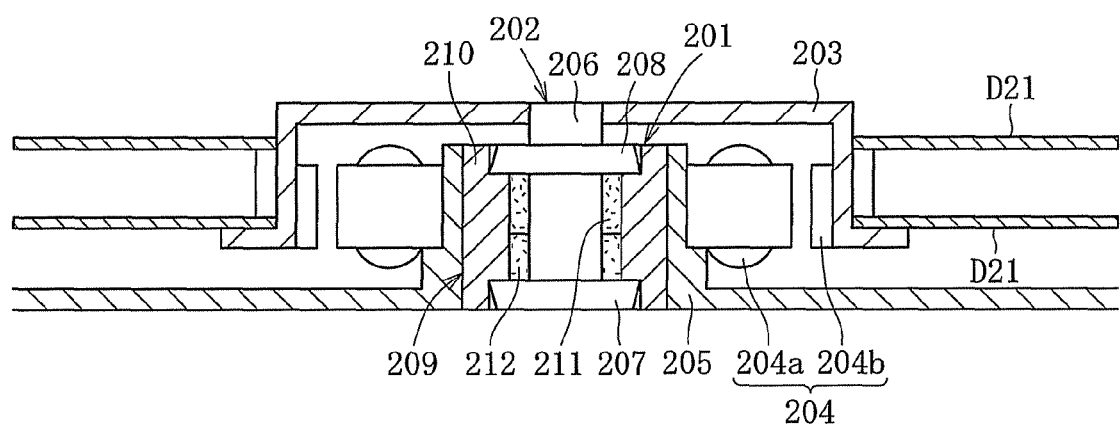
FIG. 13 is a cross-sectional view conceptually showing a spindle motor incorporating the fluid dynamic bearing device.
Figure 14:
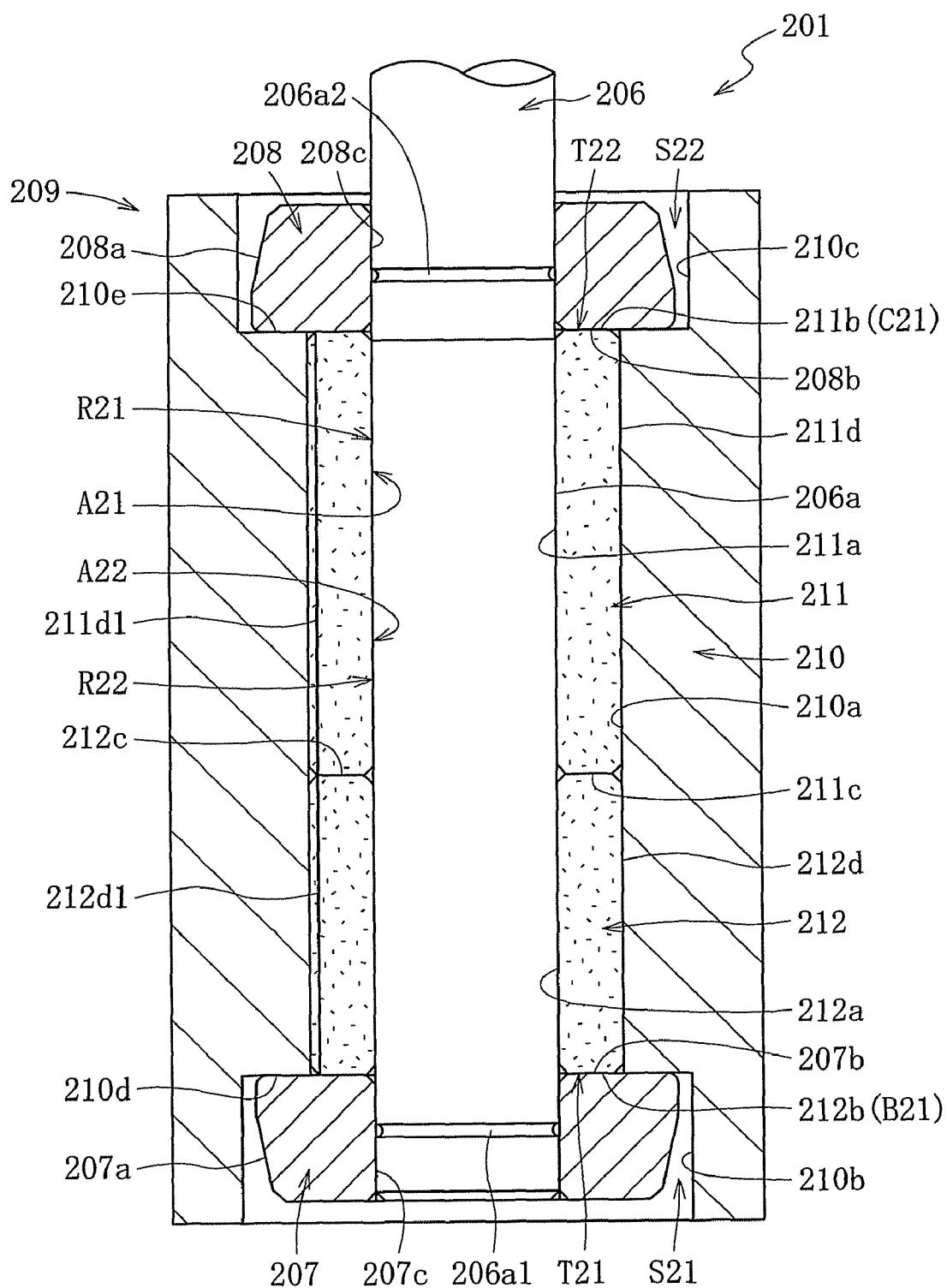
FIG. 14 is a cross-sectional view showing a first configuration example of a fluid dynamic bearing device according to a third embodiment of the present invention.
Figure 15:
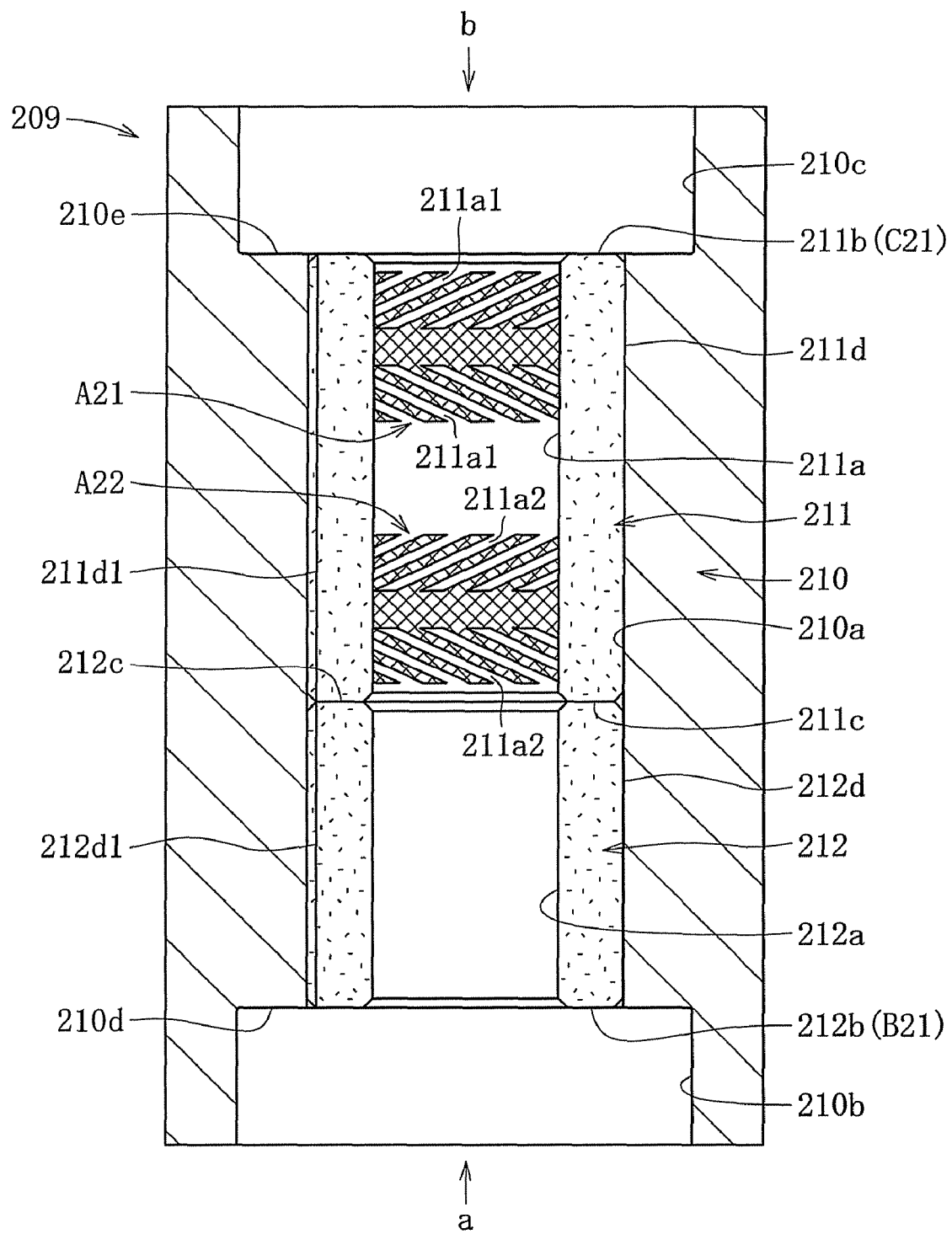
FIG. 15 is a cross-sectional view of a bearing member.
Figure 16:
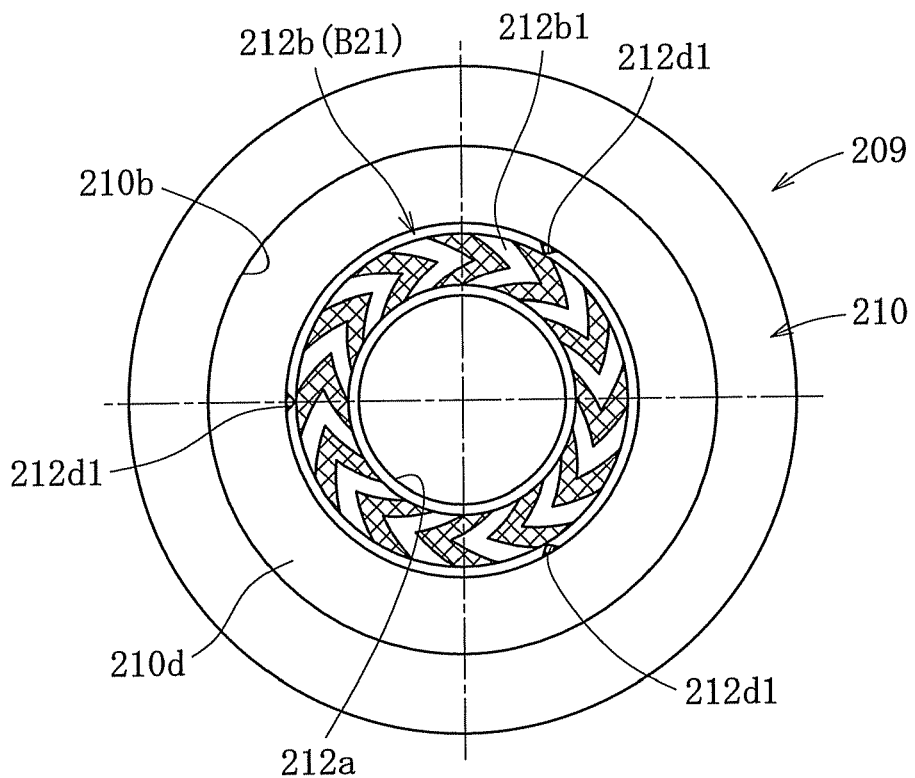
Figure 17:
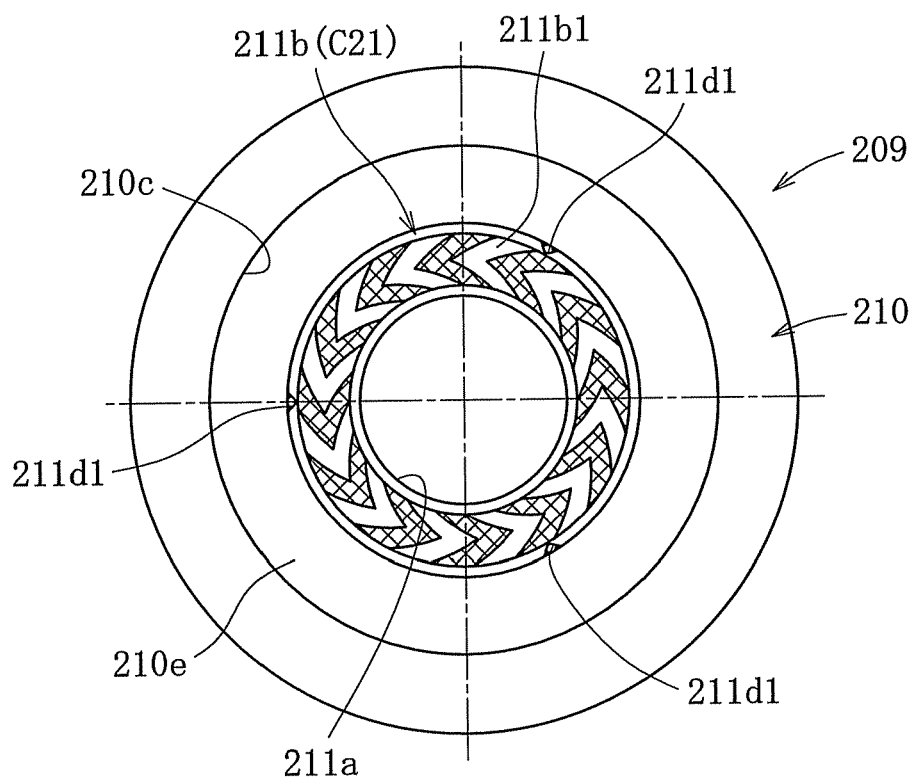
FIG. 17 is an end surface view of the bearing member shown in FIG. 15 seen from a direction of an arrow b.
Figure 18:
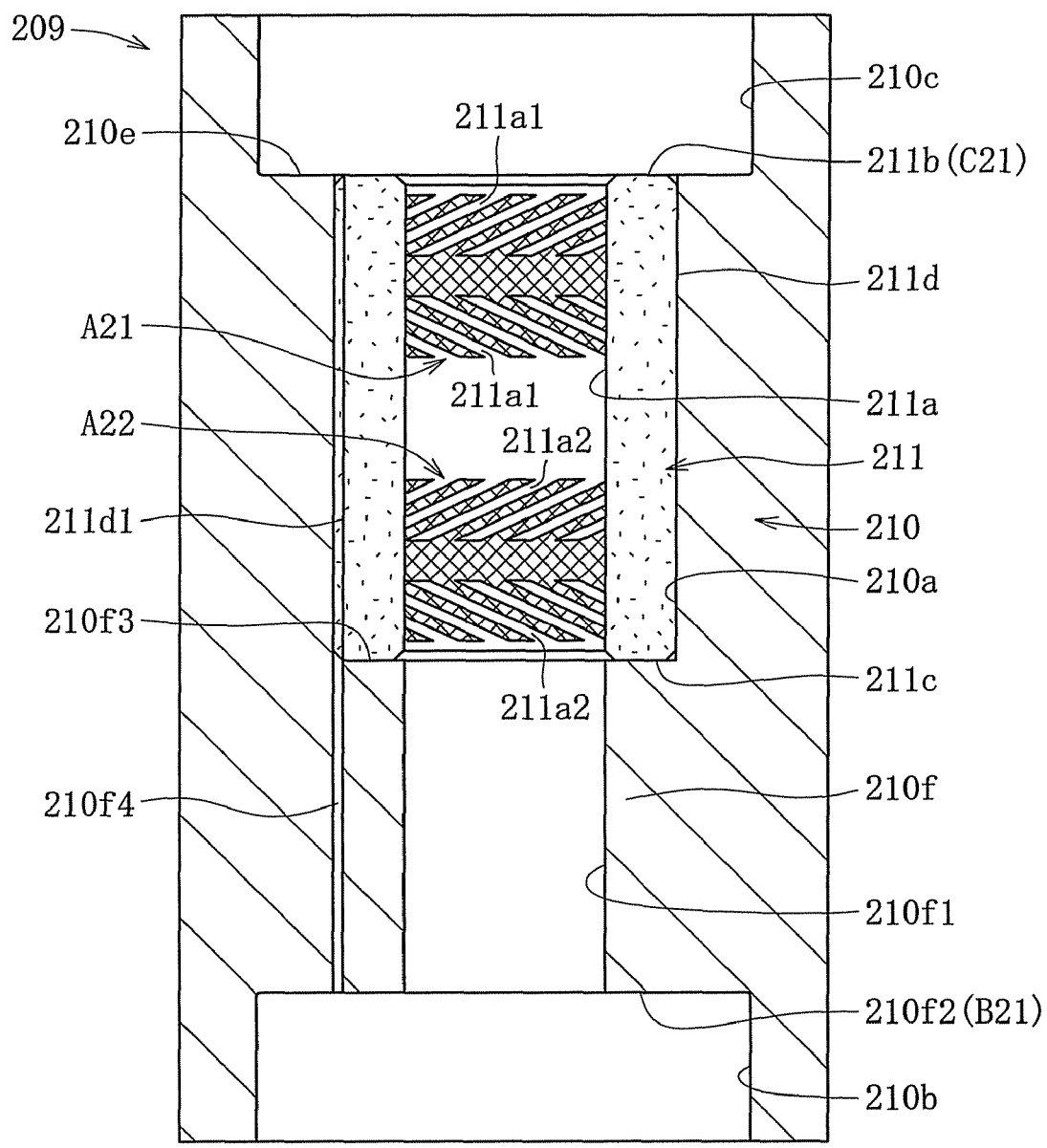
FIG. 18 is a cross-sectional view showing another configuration of the bearing member.
Figure 19:
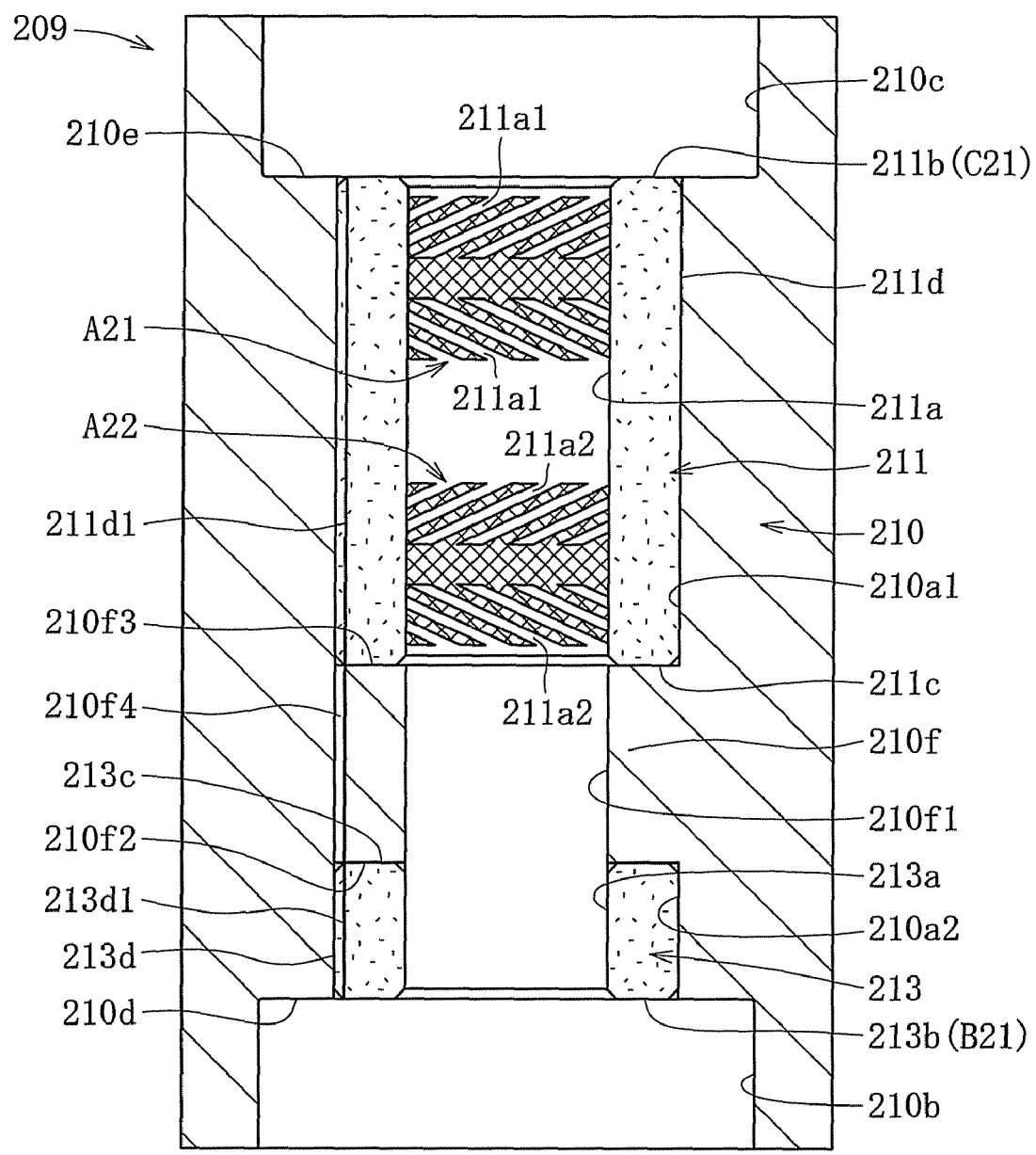
FIG. 19 is a cross-sectional view showing another configuration of the bearing member.
Figure 20:
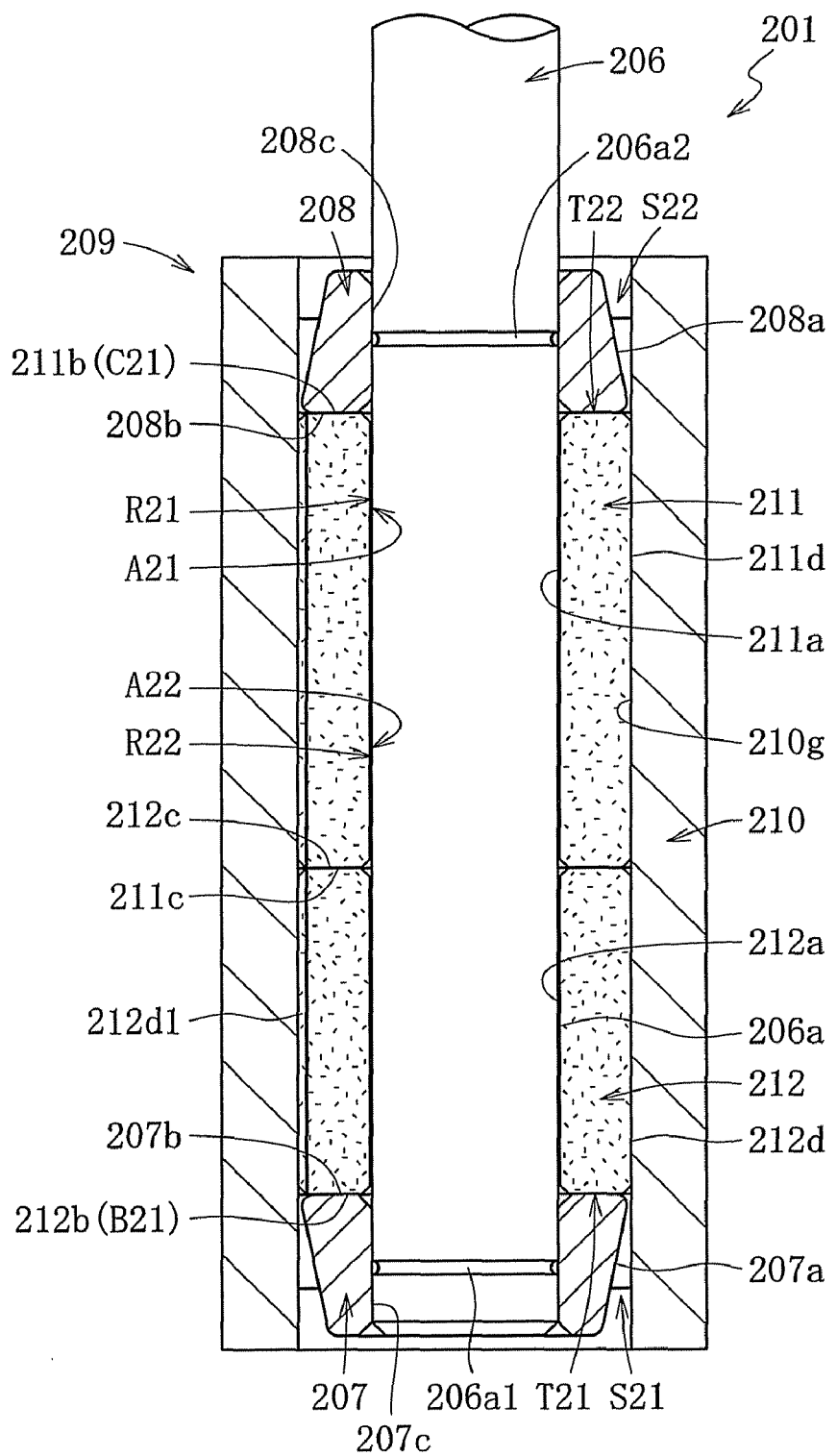
FIG. 20 is a cross-sectional view showing a second configuration example of a fluid dynamic bearing device according to the third embodiment.
Figure 21:
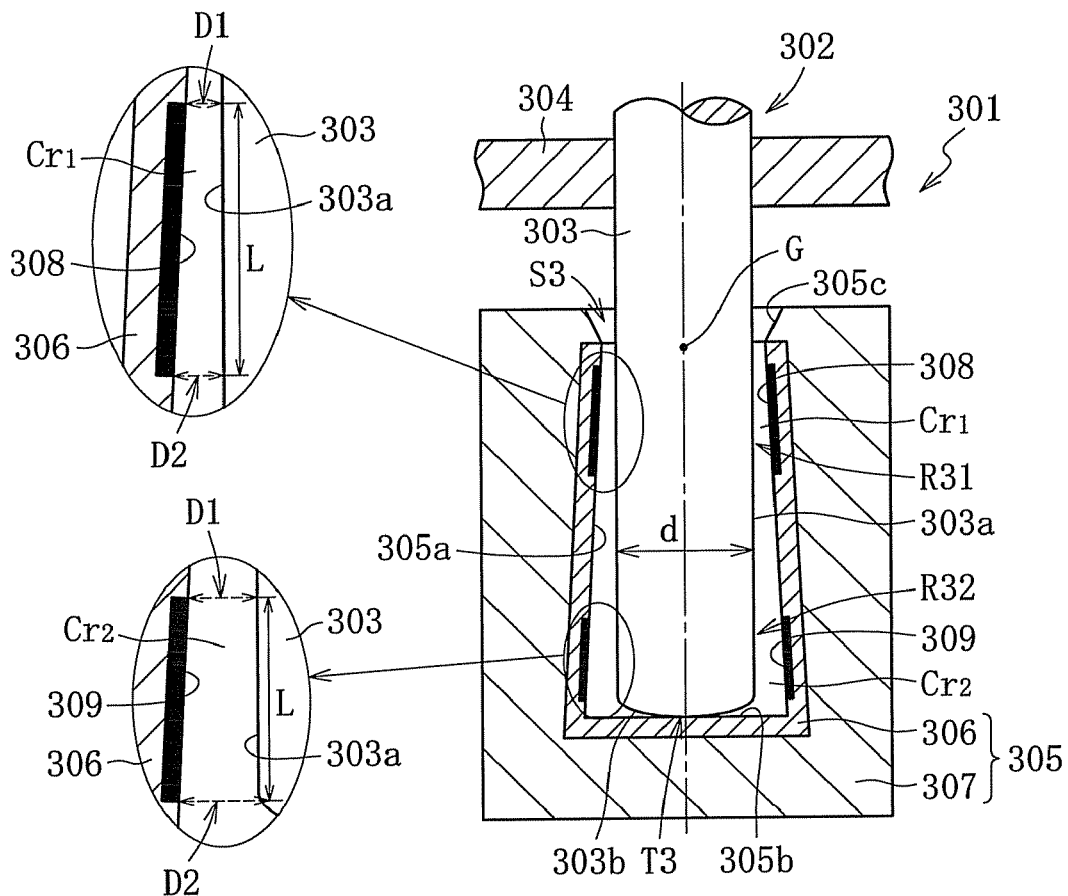
FIG. 21 is a cross-sectional view with axis showing a first configuration example of a fluid dynamic bearing device according to a fourth embodiment of the present invention.
Figure 22:
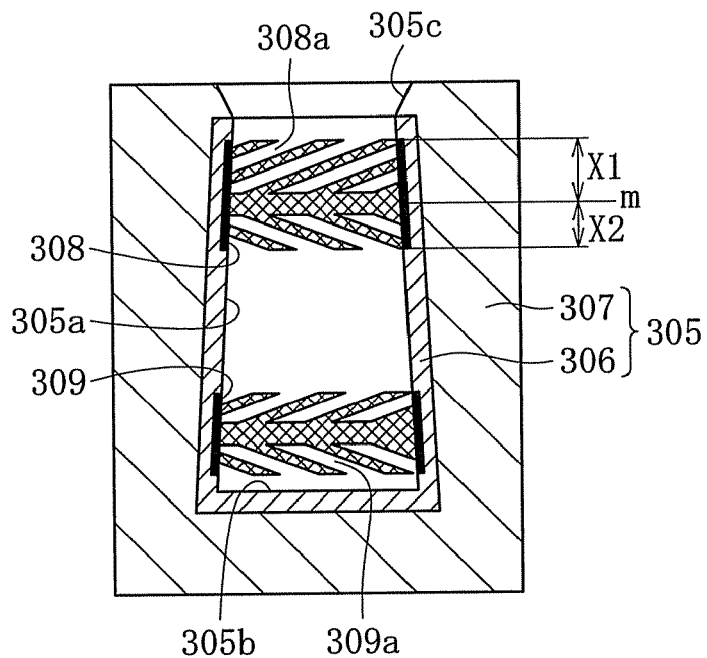
FIG. 22 is a cross-sectional view of a bearing member.
Figure 23:
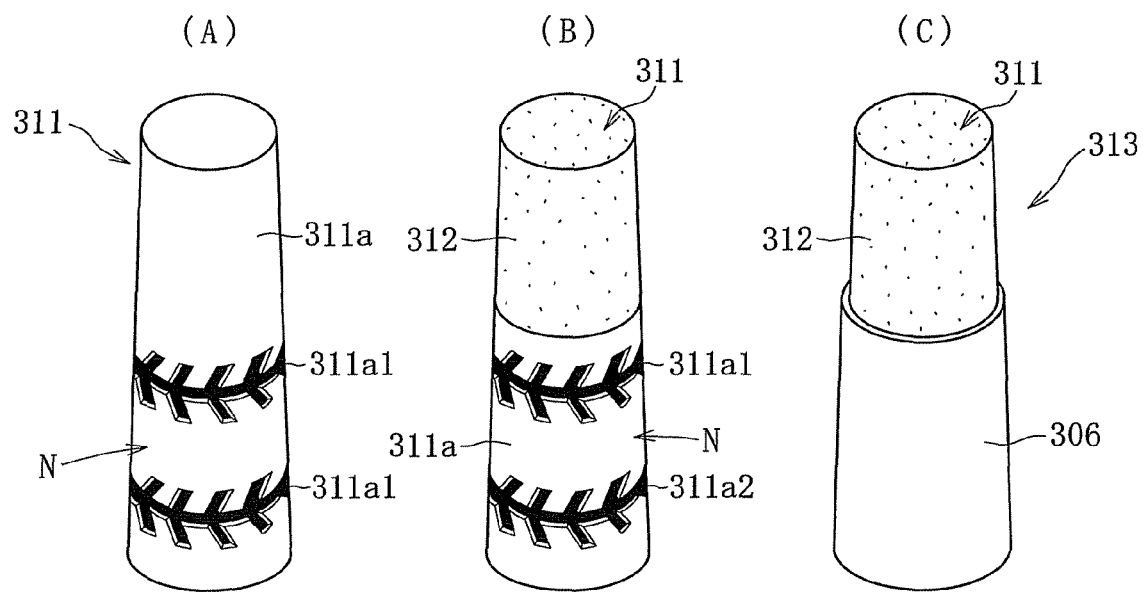
FIG. 23(A) is a perspective view of a master
FIG. 23(B) is a perspective view showing a state in which masking is performed on the master.
FIG. 23(C) is a perspective view of an electroformed member.
Figure 24:
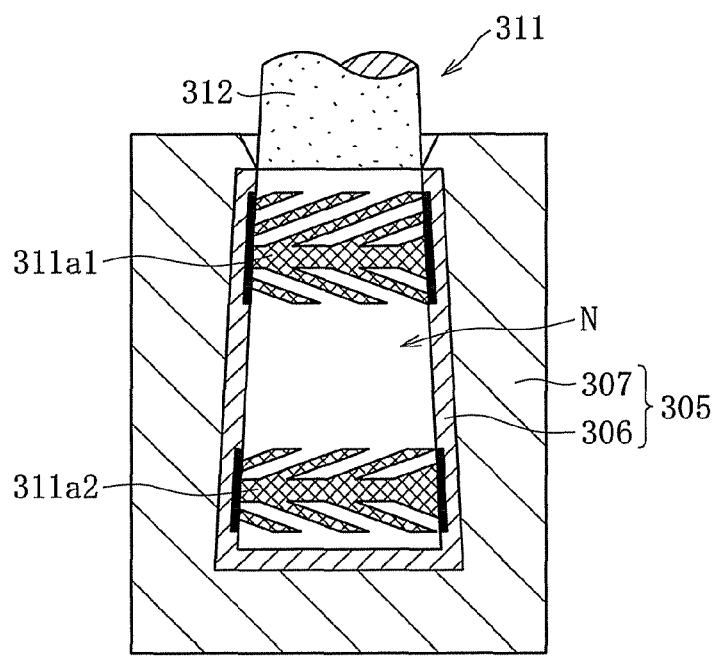
FIG. 24 is a cross-sectional view of a bearing member immediately after insert molding.
Figure 25:
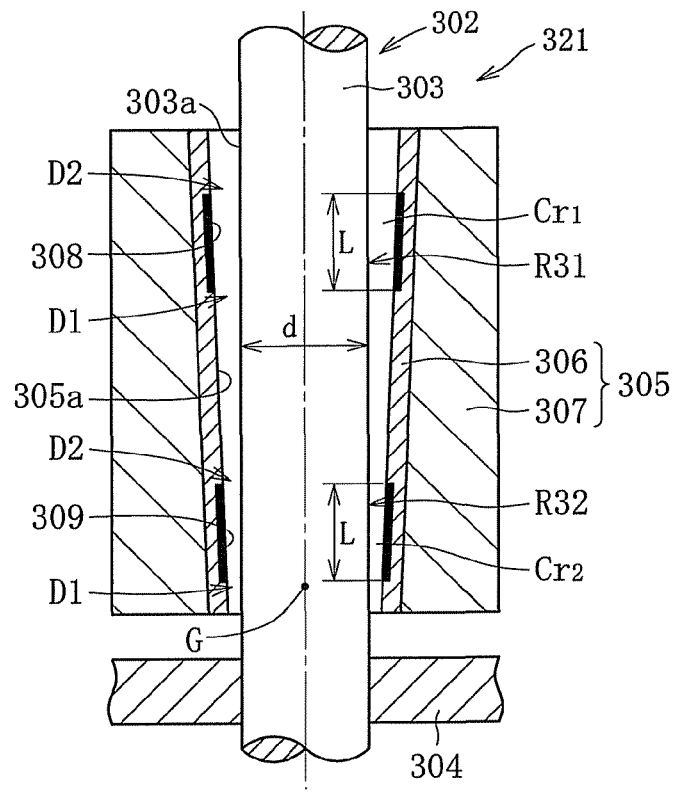
FIG. 25 is a cross-sectional view showing a second configuration example of the fluid dynamic bearing device according to the fourth embodiment.
Figure 26:
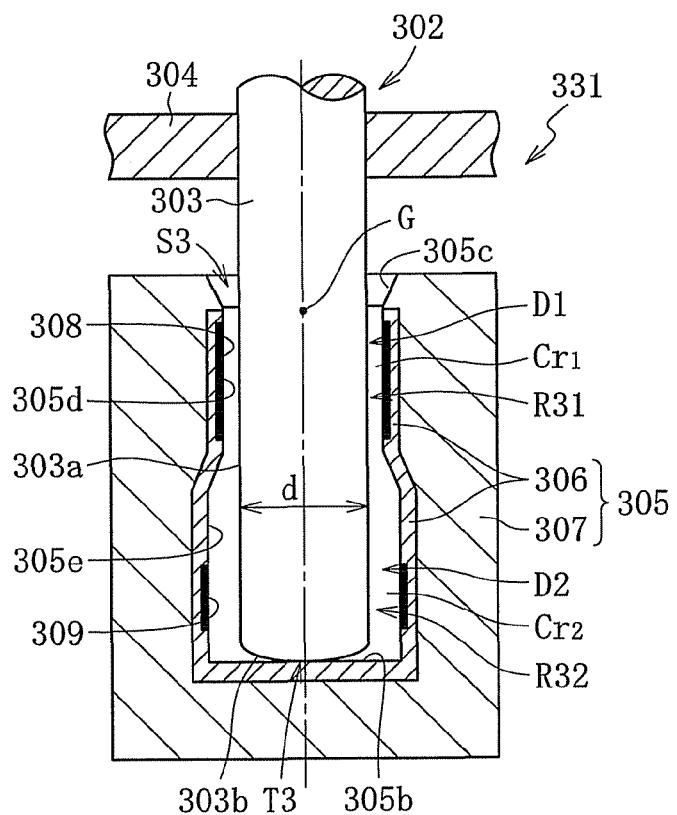
FIG. 26 is a cross-sectional view showing a third configuration example of the fluid dynamic bearing device according to the fourth embodiment.
Figure 27:
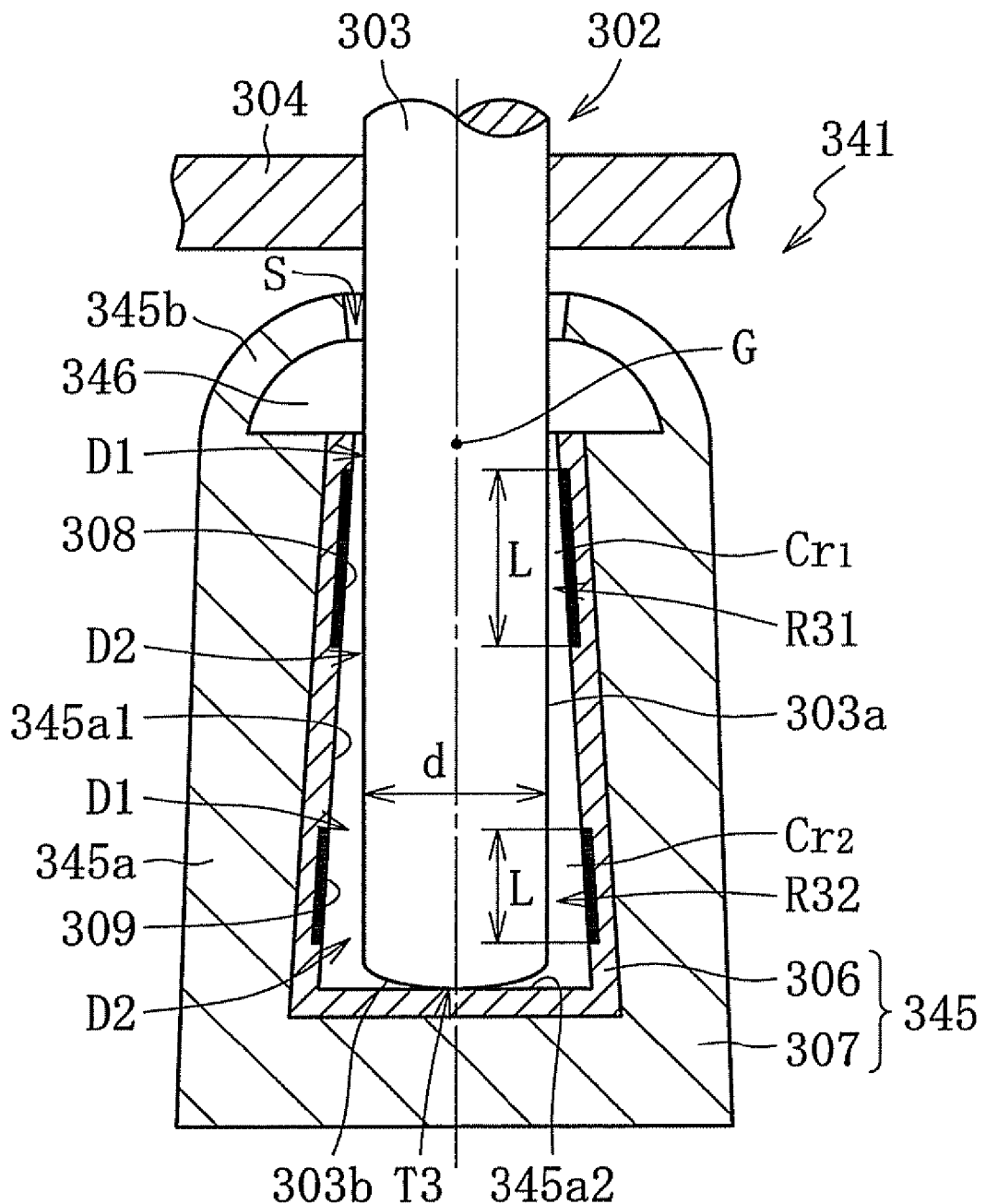
FIG. 27 is a cross-sectional view showing a fourth configuration example of the fluid dynamic bearing device according to the fourth embodiment.
Figure 28:
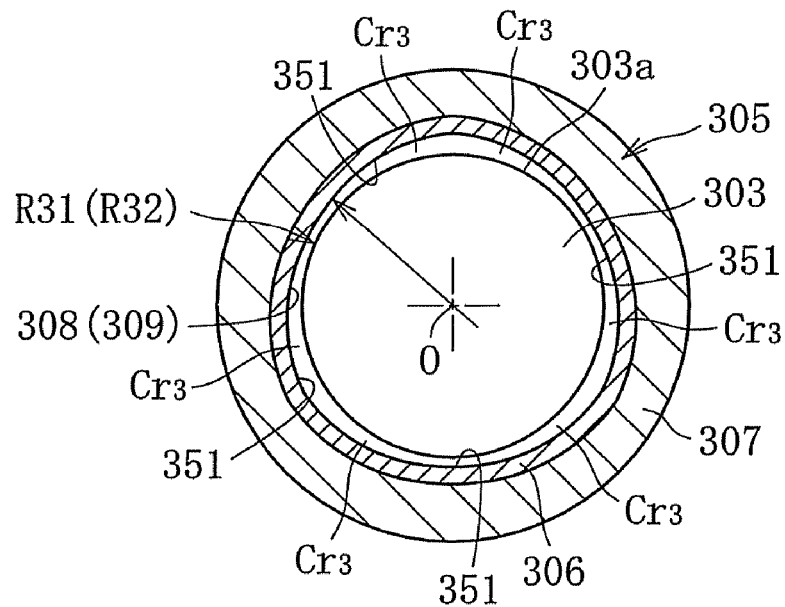
FIG. 28 is a cross-sectional view with axis of when the radial bearing part is constructed of multi-circular arc bearing.
Figure 29:
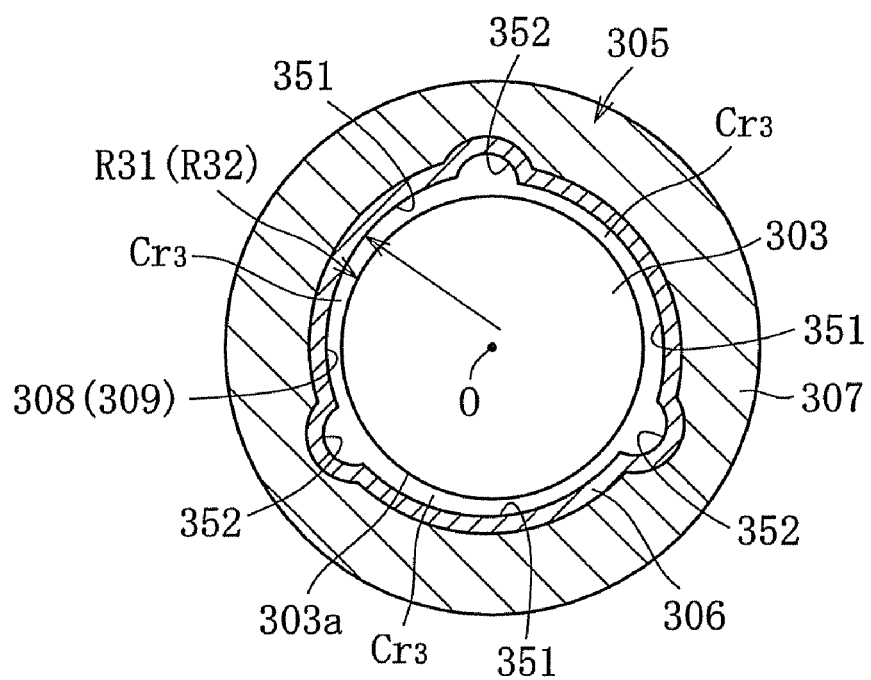
FIG. 29 is a cross-sectional view with axis of when the radial bearing part is constructed of multi-circular arc bearing.
Figure 30:
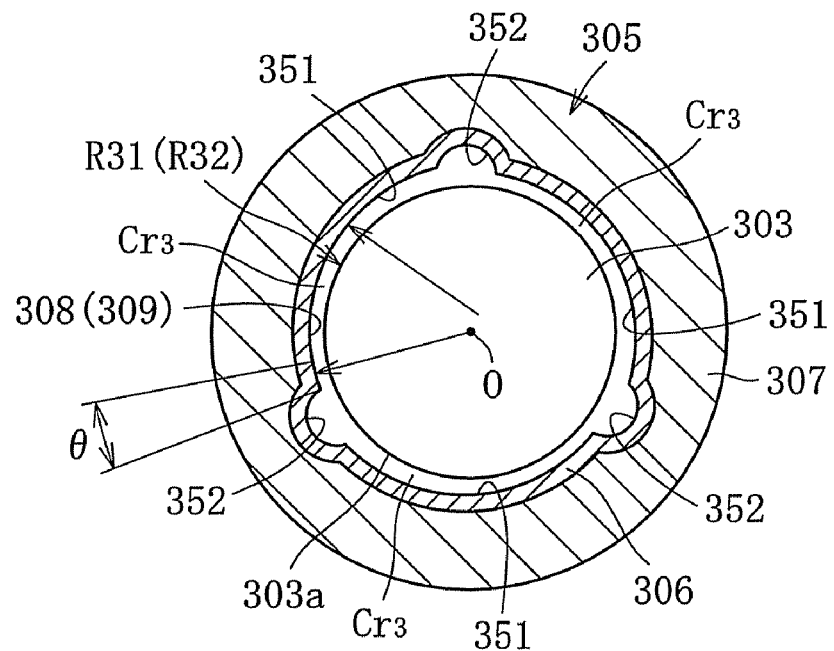
FIG. 30 is a cross-sectional view with axis of when the radial bearing part is constructed of multi-circular arc bearing.
Figure 31:
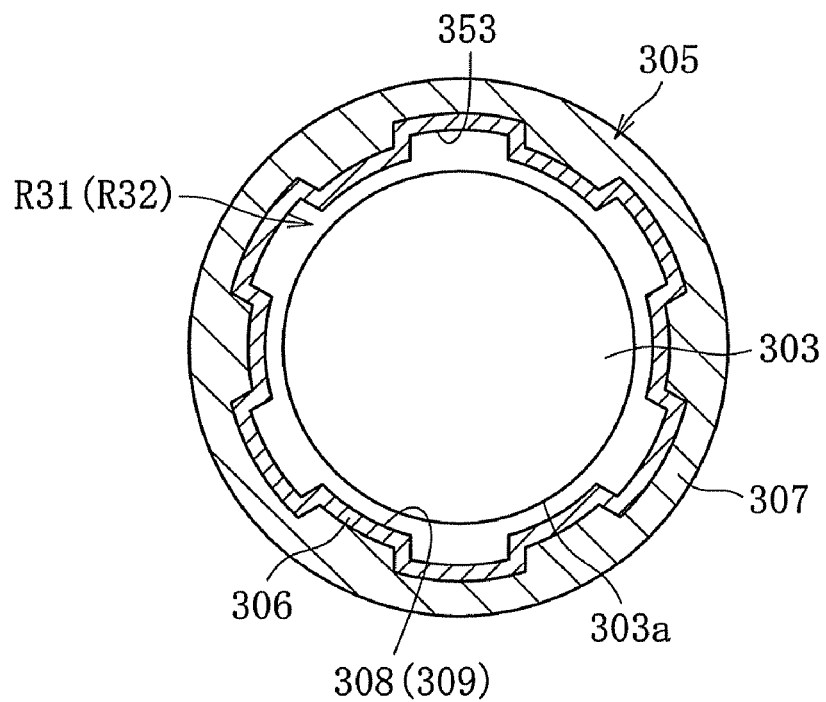
FIG. 31 is a cross-sectional view with axis of when the radial bearing part is constructed of step bearing.

DESCRIPTION OF THE SYMBOLS 1, 21 fluid dynamic bearing device
2 housing
3 first bearing sleeve
4 second bearing sleeve
5 shaft member
6,7 seal member
8 spacer member
A, A' radial bearing surface
B convex part
L1 axial length of the first bearing sleeve
L2 axial length of the second bearing sleeve
P assembly pin
R1, R2 radial bearing part
T1, T2 thrust bearing part
S1, S2 seal space
101 fluid dynamic bearing device
102 shaft member
104 stator coil
105 rotor magnet
107 housing
108 bearing member
109, 110 seal member
181 bearing sleeve
182 spacer member
81$a$1, 81$b$1, 81$c$1 dynamic pressure groove
R11, R12 radial bearing part
T11, T12 thrust bearing part
S11, S12 seal space
201 fluid dynamic bearing device
202 rotating body
203 hub
206 shaft member
207, 208 seal member
209 bearing member
210 housing
211 first bearing sleeve
212 second bearing sleeve
A21, A22 radial bearing surface
B21, C21 thrust bearing surface
R21, R22 radial bearing part
T21, T22 thrust bearing part
301, 321, 331, 341 fluid dynamic bearing device
302 rotating body
303 shaft member
304 rotor
305 bearing member
306 electroformed part
307 coated part
308, 309 radial bearing surface
311 master
312 masking part
Cr1, Cr2, Cr3 radial bearing gap
D1 narrow width part (of radial bearing gap)
D2 wide width part (of radial bearing gap)
L axial length of radial bearing gap
R31, R32 radial bearing part T3 thrust bearing part
S3 seal space
d shaft diameter of the shaft member

The invention claimed is:

1. A fluid dynamic bearing device, comprising:
a bearing sleeve including a radial bearing surface;
a shaft member to be inserted to an inner circumference of the bearing sleeve; and
a radial bearing part for non-contact supporting the shaft member in a radial direction by a dynamic pressure action of a fluid generated in a radial bearing gap between the radial bearing surface of the bearing sleeve and an outer circumferential surface of the shaft member, wherein:
a plurality of bearing sleeves are axially arranged;
each bearing sleeve is formed having a different axial length with respect to one another; and
a convex part having a diameter same as the radial bearing surface provided on an inner circumference surface of at least any one of the two adjacent bearing sleeves at a position on another bearing sleeve side rather than the radial bearing surface.

2. A fluid dynamic bearing device according to claim 1, wherein:
the shaft member has a projecting part projecting to an outer diameter side; and
a thrust bearing part for non-contact supporting the shaft member in a thrust direction with the dynamic pressure action of the fluid generated in a thrust bearing gap is provided between an end surface of the projecting part and an end surface of the bearing sleeve.

3. A fluid dynamic bearing device according to claim 2, further comprising a seal space formed on an outer circumferential side of the projecting part.

4. A fluid dynamic bearing device, comprising:
a bearing member including a radial bearing surface;
a rotating body including a shaft member to be inserted to an inner circumference of the bearing member;
a radial bearing gap formed between the radial bearing surface and an outer circumferential surface of the shaft member;
first and second thrust bearing gaps formed between one end surface of the bearing member and the rotating body and between the other end surface of the bearing member and the rotating body, respectively;
a first dynamic pressure groove region for generating a fluid dynamic pressure in the first thrust bearing gap; and
a second dynamic pressure groove region for generating a fluid dynamic pressure in the second thrust bearing gap, wherein:
the bearing member includes two bearing sleeves that are identical and arrayed in an axial direction;
the two bearing sleeves both have a radial bearing surface at an inner peripheral surface, and the first dynamic pressure groove region and the second dynamic pressure groove region at one end face and the other end face, respectively;
the first dynamic pressure groove region of one bearing sleeve faces the first thrust bearing gap; and
the second dynamic pressure groove region of another bearing sleeve faces the second thrust bearing gap.

5. A fluid dynamic bearing device according to claim 4, wherein the first dynamic pressure groove region and the second dynamic pressure groove region are formed into different shapes.

6. A fluid dynamic bearing device according to claim 4, further comprising a spacer member interposed between the two bearing sleeves.

7. A motor comprising: the fluid dynamic bearing device according to any one of claims 1 and 2 to 6; a rotor magnet; and a stator coil.

* * * * *